United States Patent [19]

Nakayama et al.

[11] Patent Number: 5,182,777
[45] Date of Patent: Jan. 26, 1993

[54] METHOD FOR EXTRACTING FEATURE QUANTITIES OF A CHARACTER

[75] Inventors: Hiroshi Nakayama, Yokohama; Keiji Kojima, Kawasaki; Gen Sato, Yokohama, all of Japan

[73] Assignee: Ricoh Company, Ltd., Tokyo, Japan

[21] Appl. No.: 690,333

[22] Filed: Apr. 26, 1991

Related U.S. Application Data

[63] Continuation of Ser. No. 191,608, May 6, 1988.

[30] Foreign Application Priority Data

| May 8, 1987 | [JP] | Japan | 62-111765 |
| May 8, 1987 | [JP] | Japan | 62-111766 |
| May 8, 1987 | [JP] | Japan | 62-111767 |
| May 30, 1987 | [JP] | Japan | 62-135396 |
| Jun. 3, 1987 | [JP] | Japan | 62-139109 |
| Apr. 1, 1988 | [JP] | Japan | 63-80949 |

[51] Int. Cl.$^5$ .................. G06K 9/34; G06K 9/46; G06K 9/48; G06K 9/66
[52] U.S. Cl. ............................. 382/18; 382/9; 382/21; 382/22; 382/24
[58] Field of Search ............ 382/16, 18, 21, 24, 382/22, 9

[56] References Cited

U.S. PATENT DOCUMENTS 4,757,551  7/1988  Kobayashi et al. ............... 382/18

FOREIGN PATENT DOCUMENTS 3633743  7/1987  Fed. Rep. of Germany .
2190778  10/1988  United Kingdom .

Primary Examiner—David K. Moore
Assistant Examiner—Michael R. Cammarata
Attorney, Agent, or Firm—Oblon, Spivak, McClelland, Maier & Neustadt

[57] ABSTRACT

In a method of extracting feature quantities of a character, a pair of region dividing lines which intersect a character image are obtained by using generated projections of direction codes. Then, a reference position for extracting feature quantities of the character is decided by finding positions at which the region dividing lines intersect the character image. Thereafter, the feature quantities of the character having the reference position are extracted by subjecting the codes of the divided segments to a predetermined operation for obtaining information regarding a shape of each of the divided segments.

20 Claims, 39 Drawing Sheets

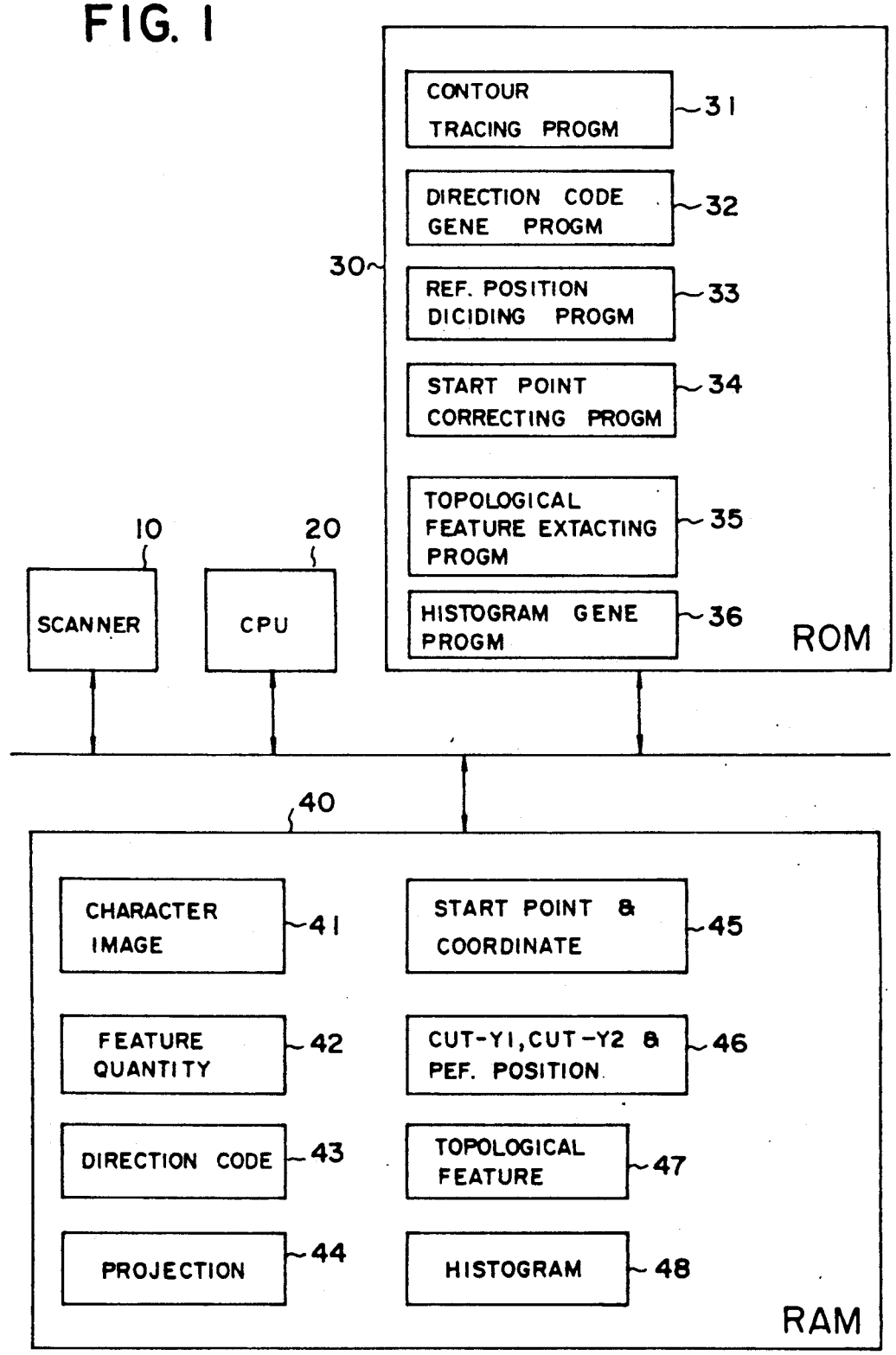

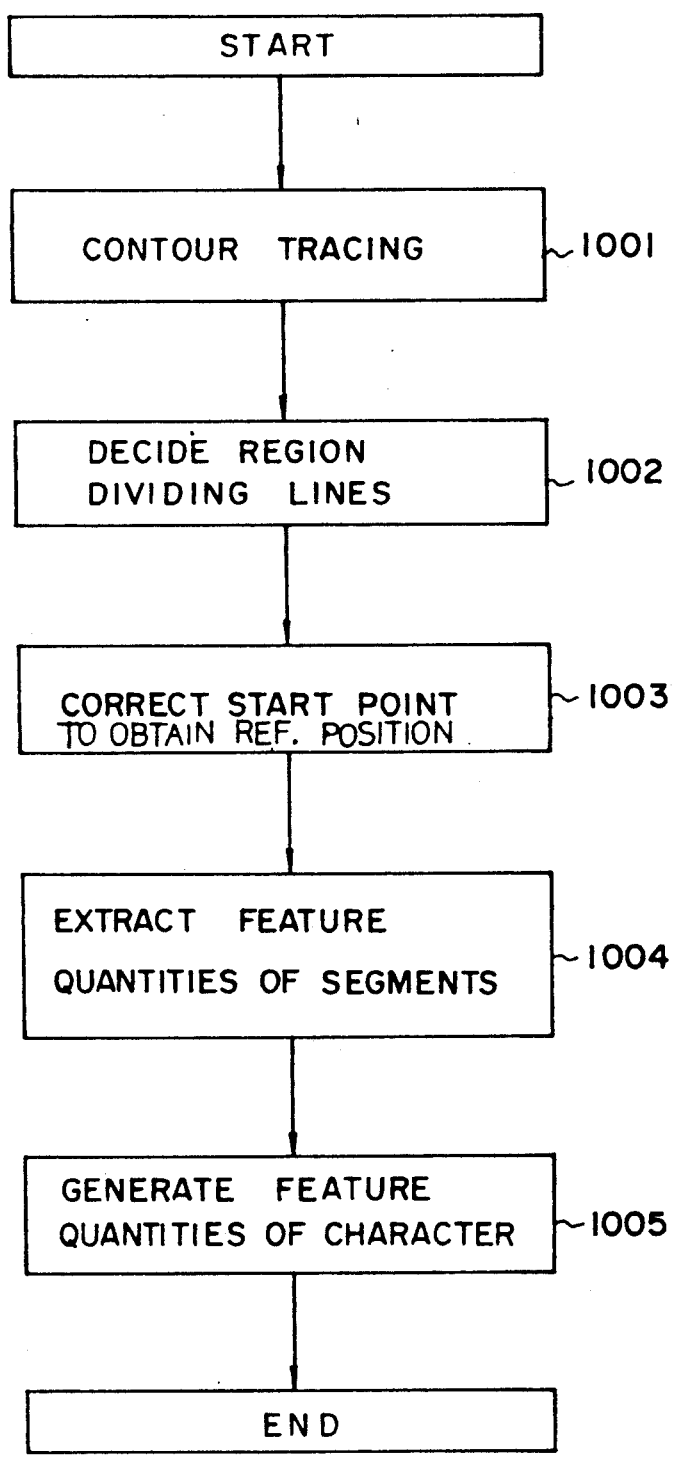

| ΔIP VECTOR | DIRECTION CODE |
|---|---|
| (0 1) | #1 |
| (1 0) | #2 |
| (0 -1) | #3 |
| (-1 0) | #4 |

FIG. 9A

| #1 | #3 | | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|
| 0 | 0 | ↓ | 1 | | | | | | | | | | | | | | | | | |
| 1 | 0 | Y | 2 | | | 1 | 4 | 4 | 4 | 4 | 4 | 4 | 4 | 4 | 4 | 4 | 4 | | | |
| 1 | 1 | | 3 | | | 1 | | | | | | | | | | | | 3 | | |
| 1 | 1 | | 4 | | | 1 | | | | | | | | | | | | 3 | | |
| 1 | 1 | | 5 | | | 1 | | | | 2 | 2 | 2 | 2 | 2 | 2 | 2 | 2 | 3 | | |
| 1 | 1 | | 6 | | | 1 | | | | 3 | | | | | | | | | | |
| * | * | | 7 | | | * | | | | 3 | | | | | | | | | | |

CUT-Y1 → (row 3)

FIG. 9B

| #1 | #3 | | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|
| 0 | 0 | ↓ | 1 | | | | | | | | | | | | | | | | | |
| 2 | 0 | Y | 2 | | | 1 | 4 | 4 | 4 | 4 | 4 | 4 | 4 | 1 | 4 | 4 | 4 | 4 | | | |
| 1 | 2 | | 3 | | | 1 | | | | | | | 3 | 4 | | | | 3 | | | |
| 1 | 1 | | 4 | | | 1 | | | | | | | | | | | | 3 | | | |
| 1 | 1 | | 5 | | | 1 | | | | 2 | 2 | 2 | 2 | 2 | 2 | 2 | 2 | 3 | | | |
| 1 | 1 | | 6 | | | 1 | | | | 3 | | | | | | | | | | | |
| * | * | | 7 | | | * | | | | 3 | | | | | | | | | | | |

CUT-Y1 → (row 4)

FIG. 9C

| #1 | #3 | | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|
| 2 | 0 | ↓ | 1 | | | | | | | 1 | 4 | | | 1 | 4 | | | | | | |
| 1 | 2 | Y | 2 | | | 1 | 4 | 4 | | 3 | 4 | 4 | 4 | | 3 | 4 | 4 | 4 | | | |
| 1 | 1 | | 3 | | | 1 | | | | | | | | | | | | 3 | | | |
| 1 | 1 | | 4 | | | 1 | | | | | | | | | | | | 3 | | | |
| 1 | 1 | | 5 | | | 1 | | | | 2 | 2 | 2 | 2 | 2 | 2 | 2 | 2 | 3 | | | |
| 1 | 1 | | 6 | | | 1 | | | | 3 | | | | | | | | | | | |
| * | * | | 7 | | | * | | | | 3 | | | | | | | | | | | |

CUT-Y1 → (row 3)

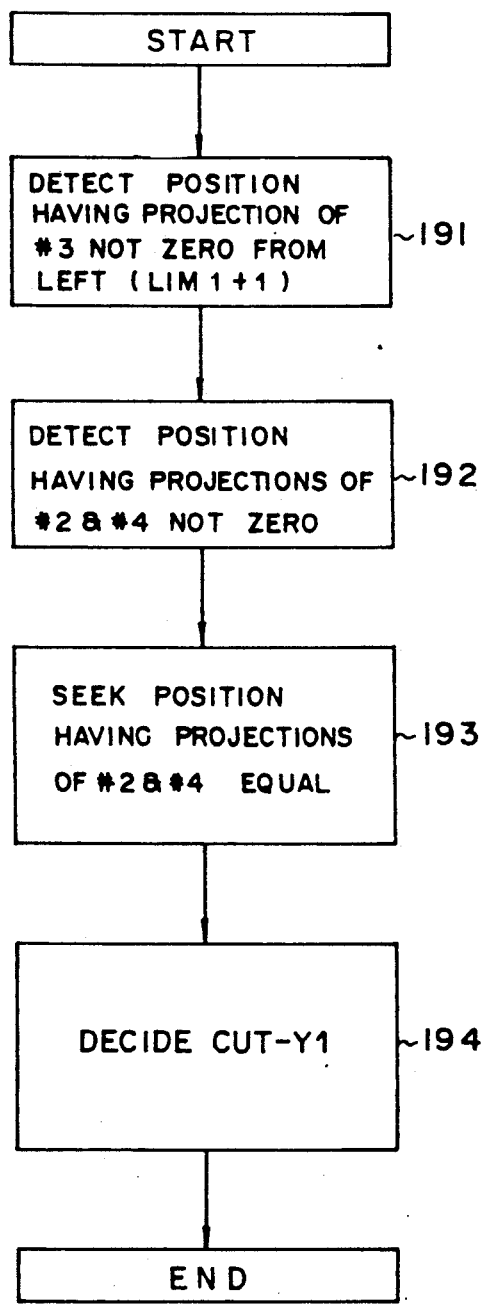
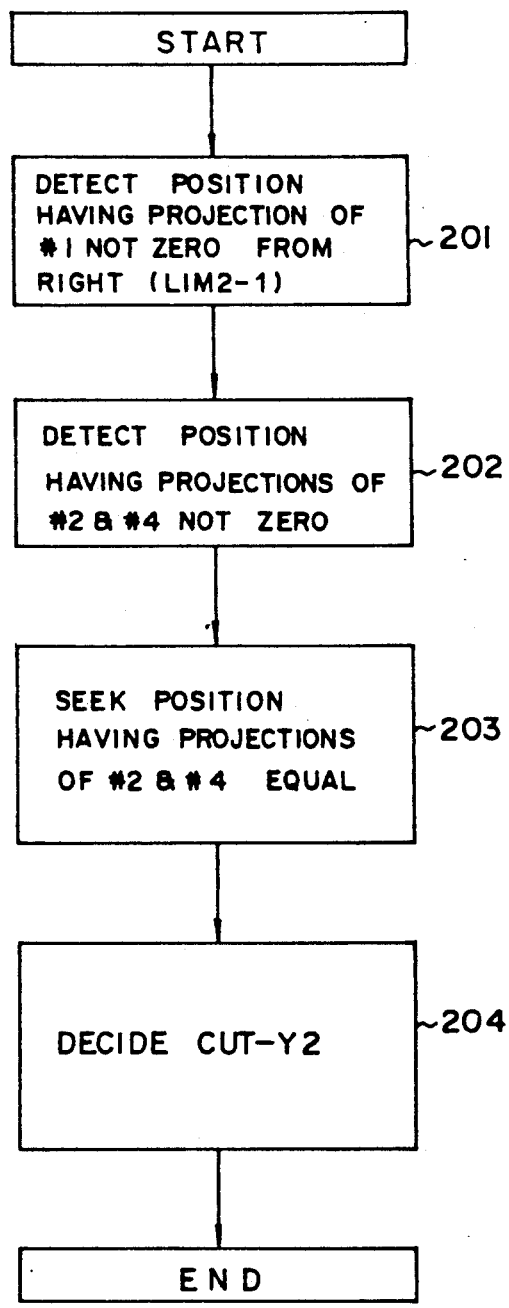

FIG. 22

| | →X | | | | | | | | | | | | | | |
|---|---|---|---|---|---|---|---|---|---|---|---|---|---|---|---|
| ↓y | 1 | 2 | 3 | 4 | 5 | 6 | 7 | 8 | 9 | 10 | 11 | 12 | 13 | 14 | 15 |
| 1 | | | | | | 1 | 4 | 4 | 4 | 4 | 4 | | | | |
| 2 | | | | | 1 | 4 | ■ | ■ | ■ | ■ | 3 | 4 | | | |
| CUT-Y1→3 | + | + | + | ▨1 | 4 | ■ | ■ | ■ | ■ | ■ | ■ | ▨3 | 4 | 4 | + |
| 4 | | | 1 | 4 | ■ | ■ | ■ | 2 | 1 | ■ | ■ | ■ | ■ | 3 | |
| 5 | | | 1 | ■ | ■ | ■ | 2 | 3 | 2 | 1 | ■ | ■ | ■ | 3 | |
| 6 | | | 1 | ■ | ■ | 2 | 3 | | | 2 | 2 | 2 | 2 | 3 | |
| 7 | | | 1 | ■ | ■ | 3 | 4 | | | | | | | | |
| 8 | | | 1 | ■ | ■ | ■ | 3 | 4 | | | | | | | |
| 9 | | 2 | 1 | ■ | ■ | ■ | 3 | 4 | 4 | | | | | | |
| 10 | | | 2 | 1 | ■ | ■ | ■ | ■ | 3 | 4 | | | | | |
| 11 | | | | 2 | 2 | 1 | ■ | ■ | ■ | 3 | 4 | | | | |
| 12 | | | | | | 2 | 1 | ■ | ■ | ■ | 3 | 4 | | | |
| 13 | | | | | | | 2 | 1 | ■ | ■ | ■ | 3 | 4 | | |
| 14 | | | | | | | | 2 | 1 | ■ | ■ | ■ | 3 | | |
| 15 | | | | | | | | | 2 | 1 | ■ | ■ | 3 | | |
| 16 | | 1 | 4 | 4 | 4 | 4 | | | | | 1 | ■ | ■ | 3 | |
| 17 | | 1 | ■ | ■ | ■ | 3 | 4 | | | 1 | 4 | ■ | ■ | 3 | |
| 18 | | 2 | 1 | ■ | ■ | ■ | 3 | 4 | 4 | 4 | ■ | ■ | ■ | 3 | |
| 19 | | | 1 | ■ | ■ | ■ | ■ | ■ | ■ | ■ | ■ | ■ | 2 | 3 | |
| CUT-Y2→20 | + | + | 2 | ▨1 | ■ | ■ | ■ | ■ | ■ | ■ | ■ | 2 | ▨3 | + | + |
| 21 | | | | 2 | 2 | 1 | ■ | ■ | 2 | 2 | 2 | 3 | | | |
| 22 | | | | | | 2 | 2 | 2 | 3 | | | | | | |

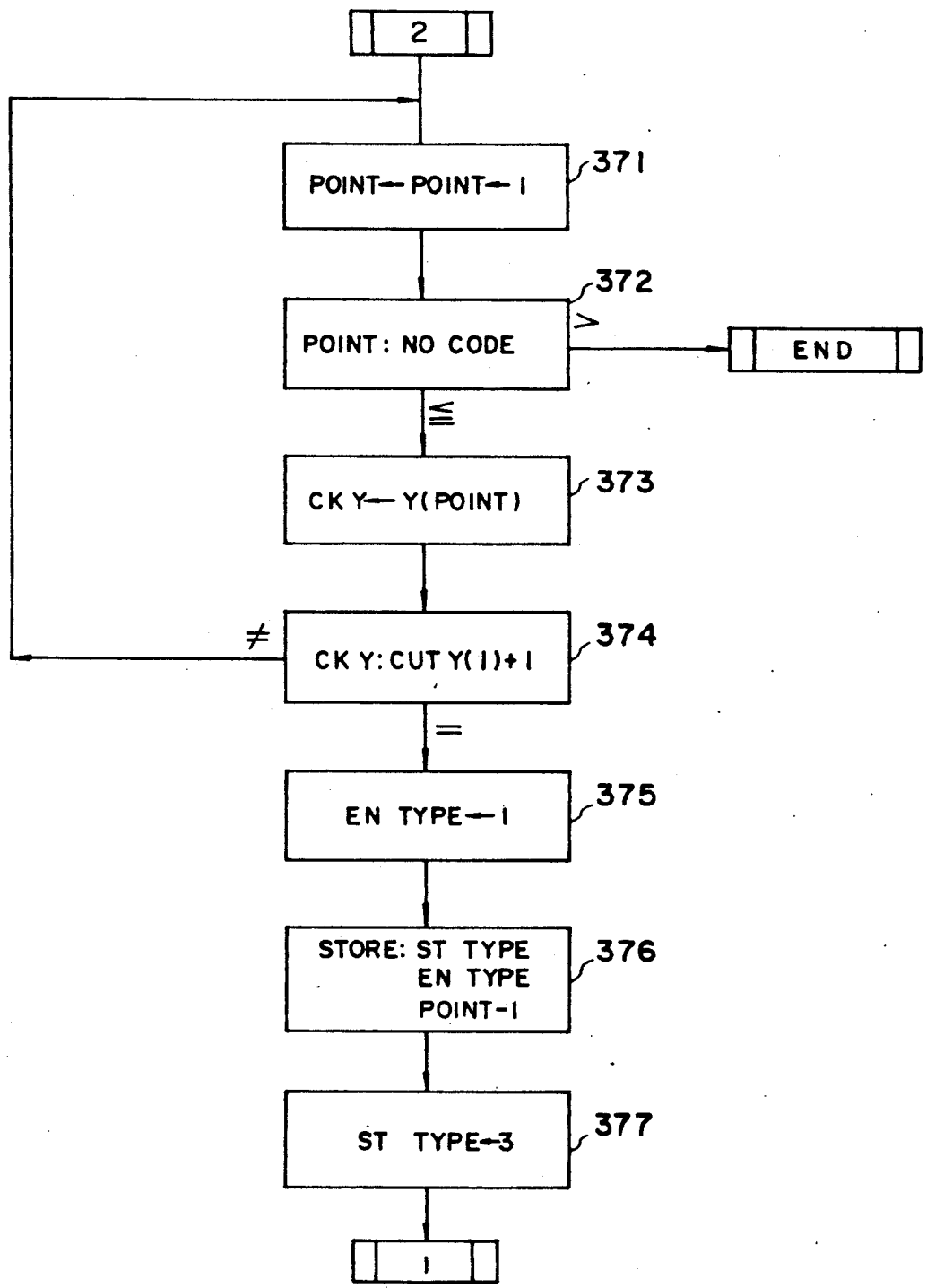

METHOD FOR EXTRACTING FEATURE QUANTITIES OF A CHARACTER

This application is a continuation of application Ser. No. 07/191,608, filed on May 5, 1988, now abandoned.

BACKGROUND OF THE INVENTION

The present invention generally relates to a method of extracting feature quantities of a character for character recognition. The present invention relates more particularly to a method of extracting feature quantities of a character which is not affected by a font style or size of a character obtained by optical scanning.

A method of extracting feature quantities of a contour portion of an unknown character by tracing the contour portion is known as one of methods of extracting feature quantities of a character which are used in an optical character reader (hereafter simply referred to as OCR). The feature quantities of the contour portion are obtained in the form of a closed loop composed of direction codes representing feature quantities. At the time when the feature quantities are compared with feature quantities of a reference (known) character stored in a dictionary, the obtained feature quantities in the form of the loop must be extended as a one-dimensional sequence or chain thereof. At this time, a reference point for cutting the loop is necessary to extend the loop of the feature quantities. On the other hand, a reference point of the group of the feature quantities of the reference character is predetermined. In practice, it is very difficult to certainly decide the reference point of the loop of the direction codes of the unknown character. When the loop is cut at an erroneous point, a difference (distance) between the feature quantities of the unknown character and the feature quantities of the known character corresponding the unknown character is increased. This leads to an increase in error in the character recognition. Conventionally, a start point from which tracing of the contour portion of the unknown character starts, is decided to be the reference point. The start point is obtained by finding the first change from a white pixel to a black pixel by raster-scanning a rectangular region having a character image, starting from the top of the rectangular region. However, the reference point thus obtained deviates due to fluctuation of a character image and is therefore unstable.

Additionally, the conventional method of extracting the feature quantities of the character contour portion cannot extract topological feature quantities of a character, i.e., information on a shape of a character by a simple process.

Moreover, another conventional method of producing a histogram of direction codes to identify the unknown character is very sensitive to variations in shape of characters. Therefore, a number of dictionaries used for storing reference histograms of characters must be prepared for various shapes of one character. This requires a large amount of memory capacity and an increased time for the character recognition.

SUMMARY OF THE INVENTION

Accordingly, a general object of the present invention is to provide a method of extracting feature quantities of a character in which the above disadvantages of the conventional methods have been eliminated.

A more specific object of the present invention is to provide a method of extracting feature quantities of a character capable of obtaining a unifying and stable reference position of a group consisting of feature quantities of a character contour portion even in the presence of noise contained in the character contour portion. The correct reference position enables improved accuracy in character recognition based on a histogram method.

Another object of the present invention is to provide a method of extracting feature quantities of a character which indicates topological information, i.e., information on a shape of the character, particularly shapes of segments obtained by dividing the character. The topological information is not affected by size and font of a character to be processed. Therefore, normally, only a type of a dictionary may be prepared for character recognition in which characters of various sizes and fonts are to be processed.

A further object of the present invention is to provide a method of extracting feature quantities of a character which enables speeding-up of the character recognition process. A character to be processed is classified into a related category before performing the character recognition process.

The above objects of the present invention are achieved by a method of extracting feature quantities of a character comprising the following steps. A first step is a step for detecting a start point from which tracing of a contour of an image of a character to be identified starts by raster-scanning a rectangular image region having the character image. A second step is a step for detecting feature quantities indicating features of a contour portion of the character by tracing one of white and black pixels of the contour portion from the start point, the feature quantities of the contour portion being described by a group of codes having different types. A third step is a step for generating a projection of each of different types of the codes by projecting the feature quantities in a predetermined projection direction. A fourth step is a step for obtaining a pair of region dividing lines which intersect the character image in a predetermined dividing direction, so that the character image is divided into corresponding segments. A fifth step is a step for deciding a reference position for extracting feature quantities of the character by finding positions at which the region dividing lines intersect the character image. A sixth step is a step for extracting the feature quantities of the character having the reference position by extracting feature quantities of the segments with respect to the region dividing lines.

Other objects, features and advantages of the present invention will become apparent from the following detailed description when read in conjunction with the accompanying drawings.

BRIEF DESCRIPTION OF THE DRAWINGS

FIG. 1 is a block diagram of a hardware configuration capable of implementing embodiments of the present invention;

FIG. 2 is a flowchart of processes performed in the present invention;

FIGS. 9A through 9C are views for explaining advantages resulting from employment of the region dividing lines;

FIG. 13A and 13B are flowcharts of algorithm of a third embodiment for obtaining region dividing

FIG. 22 is a view for explaining division of the sequence of direction codes based on the region dividing lines;

FIGS. 26A through 26C are flowcharts of algorithm of a second embodiment of steps 1004 and 1005 of FIG. 2;

DETAILED DESCRIPTION

Figure 3A:
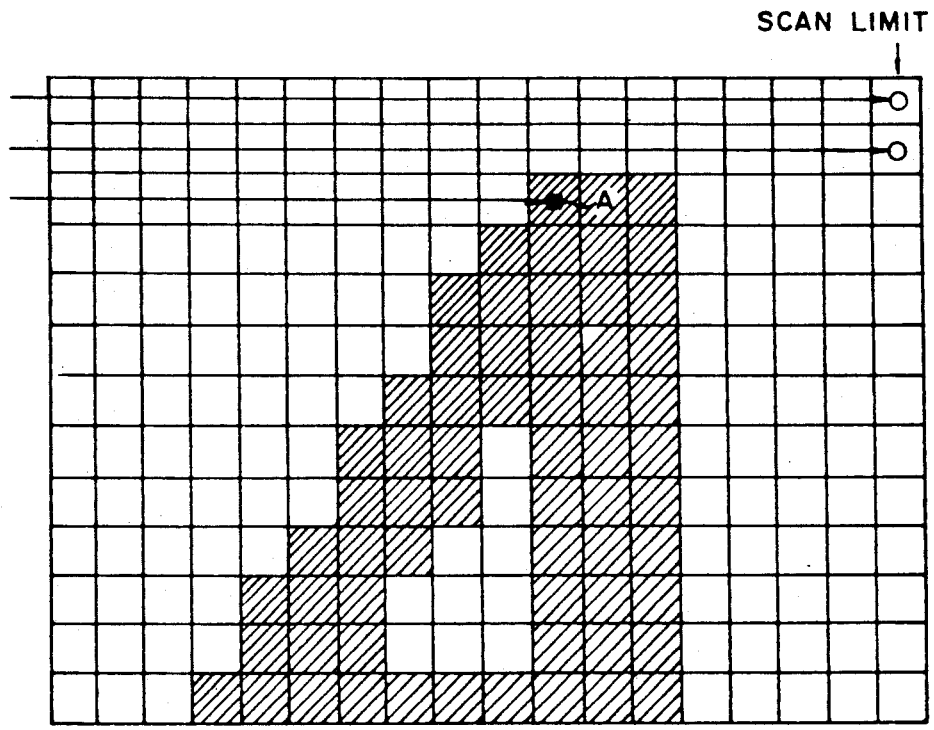
FIGS. 3A and 3B are views for explaining detection of a start point for contour tracing which is obtained by raster-scanning a character image.

FIG. 1 is a block diagram capable of implementing an embodiment of a method of extracting feature quantities of an unknown input character according to the present invention. An optical scanner 10 optically reads a character on a document and produces a binary image data having binary one indicating a black pixel and a binary zero indicating a white pixel. A central processing unit (hereafter simply referred to as CPU) 20 executes various processing defined by programs stored in a program memory 30 constituted by a read only memory (hereafter simply referred to as ROM) 30. The ROM 30 contains the following programs related to the present invention.

A contour tracing program 31 is for extracting feature quantities of a contour portion of a character image formed in a rectangular image region segmentated from the document image, by carrying out contour tracing for the character image. A projection generating program 32 is for generating projections of the extracted feature quantities of the character contour portion for each of different direction codes. A reference position deciding program 33 is for obtaining region dividing lines intersecting the character image and deciding a reference position for extracting feature quantities of the unknown character by referring to the obtained region dividing lines. A program 34 is for correcting the position of a start point from which the contour tracing starts so as to shift the start point to the decided reference position. A topological feature quantity extracting program 35 is for extracting topological feature quantities of the unknown character. A histogram generating program 36 is for extracting a histogram of direction codes (described in detail later) for each of segments of the character contour portion which are obtained by dividing the character image with respect to region dividing lines. As described later, the codes indicates a shift direction of a tracing point in which the tracing of the contour portion shifts from a current tracing point to a next tracing point.

A data memory 40 is used for storing various data processed in the system of FIG. 1. The data memory 40 is formed by a read only memory (hereafter simply referred to as a RAM), for example. The RAM 40 has the following storing regions. A character image region 41 is used for storing the inputted image read out by the scanner 10. A contour feature image region 42 is used for storing a two-dimensional image of the extracted feature quantities of the contour portion of the unknown character (that is, a character contour image to which direction codes are assigned; hereafter simply referred to as a contour feature image). A direction code storing region 43 is used for storing a sequence (one-dimension) of direction codes of the contour feature image. A region 44 is used for storing a projection of each of the direction codes of the contour feature image. A region 45 is used for storing the start point for the contour tracing as well as values of the y coordinate of the rectangular image region calculated in steps described later. A region 46 is used for storing coordinates of the region dividing lines in the rectangular image region as well as the reference position for extracting the feature quantities of the unknown character. A region 47 is used for storing topological feature quantities of the unknown character. A region 48 is used for storing histograms of the direction codes of the contour portion.

According to the present invention, the feature quantities of the unknown character are represented by either topological: features or histograms of direction codes. In order to obtain these features of the unknown character, the region dividing lines for dividing the character image into a plurality of parts are always obtained. Then the feature extraction of the unknown character is carried out on the basis of the region dividing lines.

FIG. 2 is a flowchart showing essential steps of the embodiment of the present invention. A description is given of each of the steps.

STEP 1001

At the commencement of the present process, the CPU 20 raster-scans an inputted image in the rectangular form stored in the character image region 41 provided in the RAM 40. The raster-scan is carried out from top of the rectangular image region having one character to be identified. The inputted image is obtained by segmentating a rectangular region containing one character from a document image derived from the scanner 10. Then, the CPU 20 detects a position at which a first change from a white pixel to a black pixel is observed, and decides the detected point as a start point from which the contour tracing starts. As described later, the position of the start point is corrected to avoid an error in identification of the unknown character arising from the presence of noise contained in the character image.

Figure 3B:
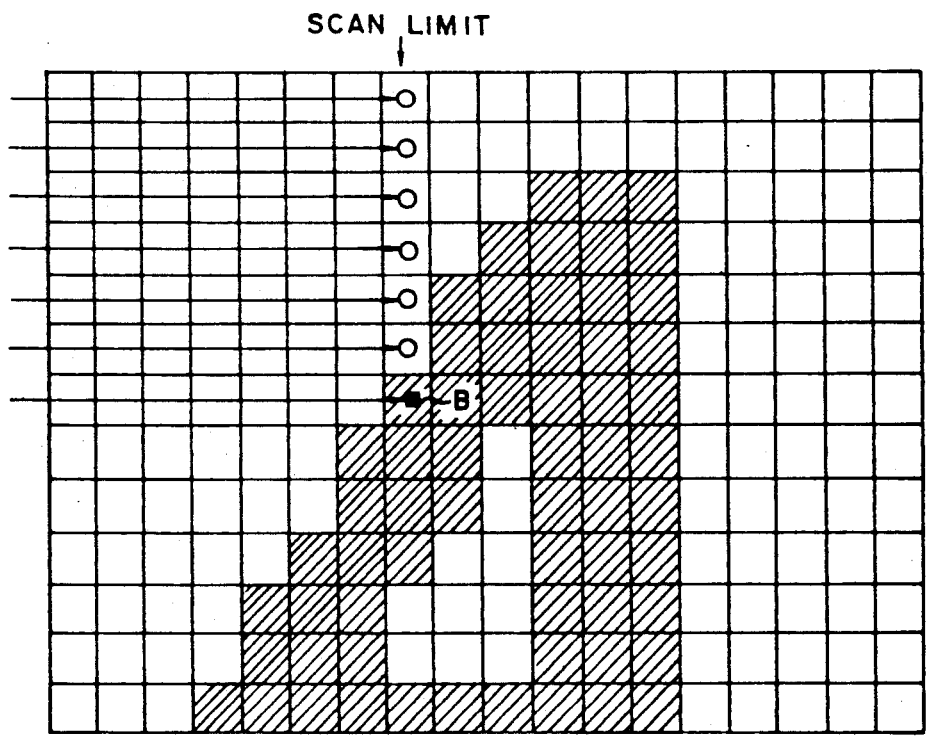

FIG. 3A shows an example in which a scan limit at which the scanning is shifted to a next scanning line is set on the right-hand end of the rectangular image region. FIG. 3B shows another example in which a scan limit is set on an intermediate position of the rectangular image region. It will be seen from FIGS. 3A and 3B that the start point of the contour tracing is not always detected at a top end of the character and depends on the setting of the scan limit. The detected start point of the contour tracing is stored in the region 45 for storing the start point provided in the RAM 40.

Subsequently the CPU 20 traces either white pixels or black pixels positioned at the contour position of the inputted character image stored in the character image region 41 in the RAM 40 in the counterclockwise or clockwise direction, and extracts feature quantities of the character contour portion. The contour tracing starts from the detected start point in accordance with the contour tracing program 31 stored in the ROM 30. It is now assumed that a feature quantity of the character contour portion is described by a direction code which indicates a direction in which the tracing of the contour portion shifts from the current tracing point to a next tracing point. From this viewpoint, such a direction code may be particularly referred to as a shift direction code.

Figures 4A, 4B, 4C:
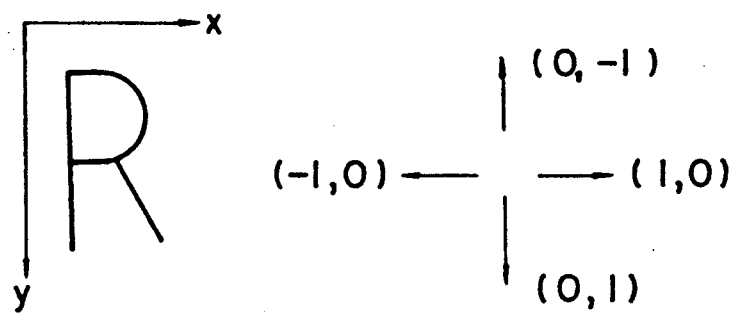
FIGS. 4A through 4C are views for explaining direction codes employed in the present invention.

FIGS. 4A through 4C are views for explaining a relationship between shift directions of the tracing point and direction codes. Assuming that a position (coordinates) of a pixel of interest, i.e., a current tracing point, is represented by a positional vector lP, shifts of the pixel of interest towards a next tracing point are represented by four unit vectors (shift direction vectors) $\Delta$lP, and the next coordinates of the tracing point, i.e., the next tracing point, is represented by lP+$\Delta$lP. Each of the four unit vectors $\Delta$lP is assigned predetermined direction codes shown in FIG. 4C, so that the feature quantities of the character contour portion can be described by the direction codes. This has been described in the United States Patent Application entitled "PATTERN RECOGNITION METHOD" now U.S. Pat. No. 4,961,231 issued Oct. 2, 1990, the disclosure of which is hereby incorporated by reference.

The group of the extracted feature quantities of the character contour portion described in the two-dimensional form, i.e., the contour feature image is stored in the contour feature image region 42 provided in the RAM 40, and the extracted direction codes themselves described in the one-dimensional form are stored in the direction code storing region 43 provided in the RAM 40. Each one address (coordinate) of the contour feature image region 42 (positions of pixels) correspond to each respective address of the character image region 41. When the next tracing point is decided, one direction code indicating the shift direction towards the next decided tracing point is written in a storage region of the contour feature image region 42, the address of which corresponds to the current tracing point. That is, the content of the contour feature image region 42 forms the two-dimensional character contour image in which direction codes are assigned to black or white pixels subjected to the contour tracing. Every time when the next tracing point is decided, the corresponding direction code is sequentially written into the direction code storing region 43 by sequentially updating the address thereof. Therefore, the content of the direction code storing region 43 forms the one-dimensional direction code sequence itself.

A further description is given of the contour tracing. In the following description of the contour tracing, white pixels at the contour portion are traced.

Figure 5A:
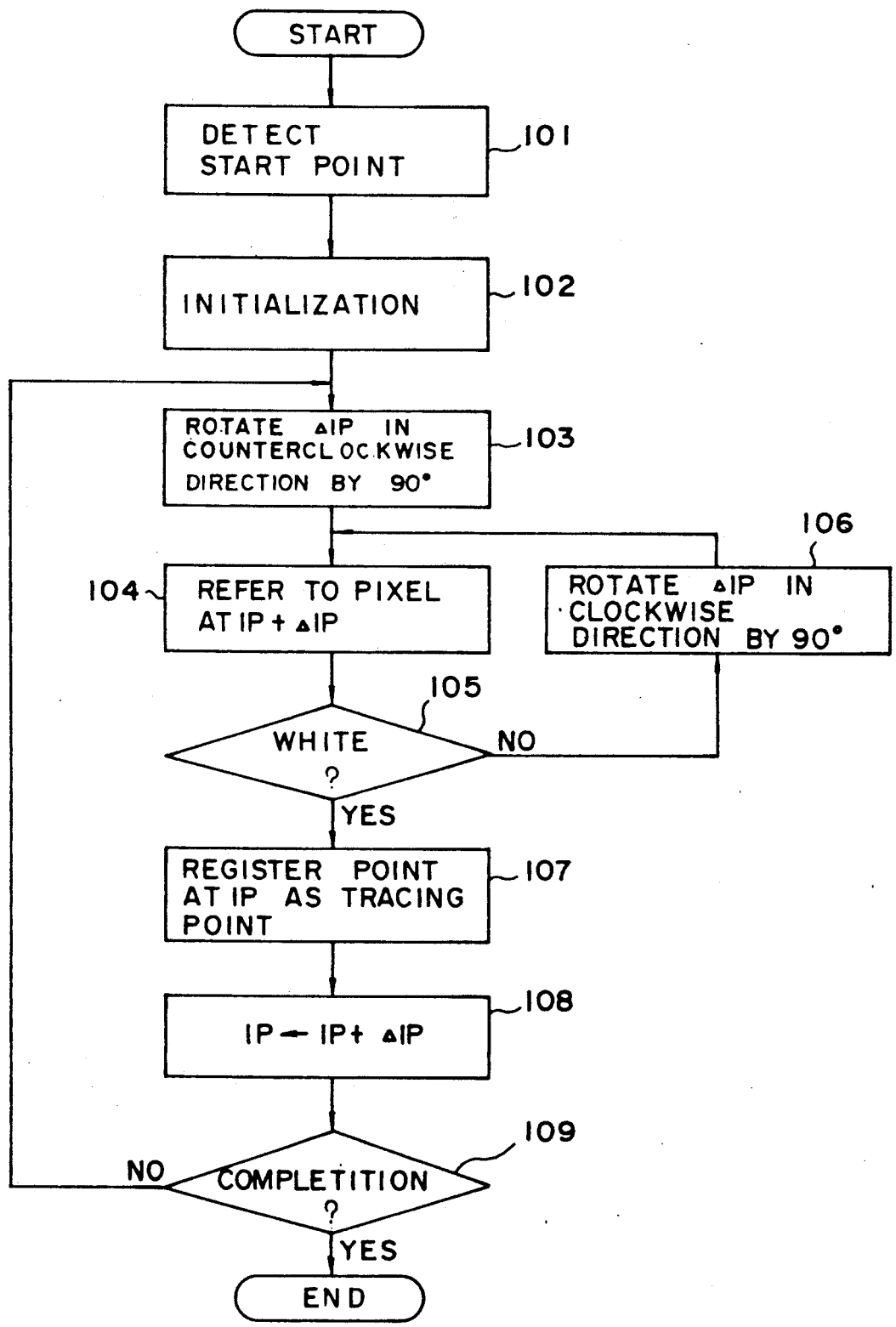
FIG. 5A is a flowchart of a process for assigning direction codes to a contour portion of a character image.

Referring to FIG. 5A, a binary image is raster-scanned and a first white pixel immediately followed by a black pixel in the raster-scanning direction is detected (step 101 in FIG. 5A). Then, a vector lP+$\Delta$lP with respect to the above first white pixel which is the start point from which the contour tracing starts is set to an initial value (step 102). At this step, the vector lP is designated as the position (coordinates) of the start point, and the unit vector $\Delta$lP is designated as the unit vector having a direction opposite to the raster-scanning direction.

Figure 5B:
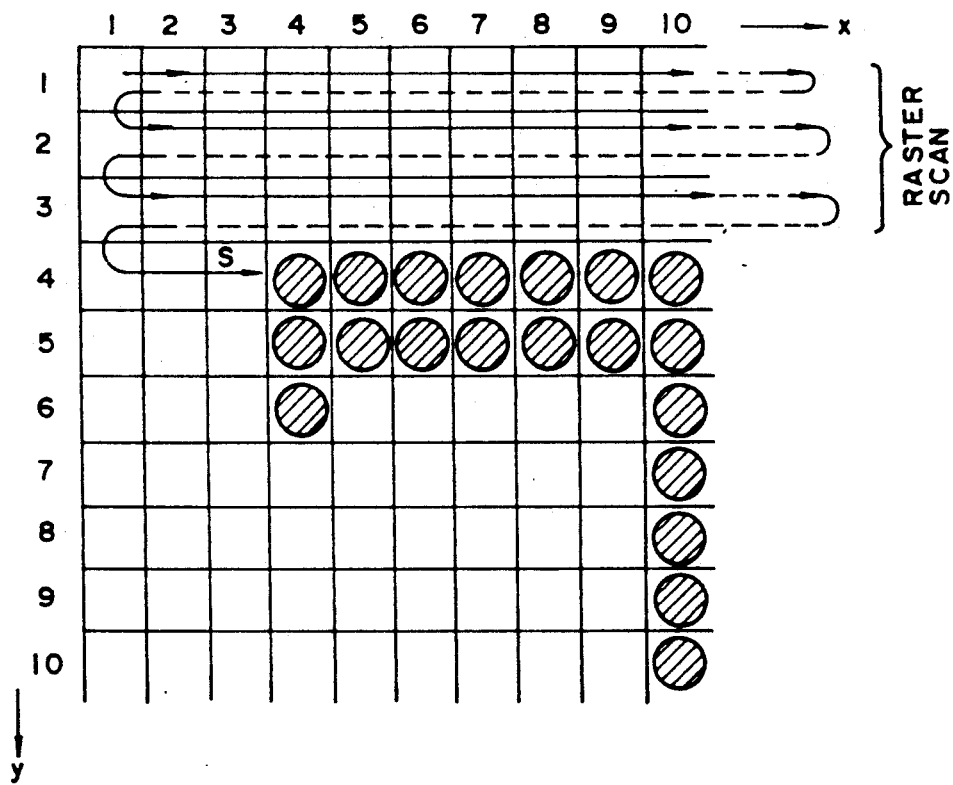
FIG. 5B is a view for explaining an initial operation of the contour tracing.

FIG. 5B is a view for explaining the initialization of the vector lP and $\Delta$lP in detail. In this figure, hatched circles denote black pixels, and numerals aligned along the x and y directions denote coordinates. Further, arrows indicate a direction of the raster-scan. In the example illustrated, a white pixel indicated by S is a first white pixel immediately followed by a black pixel in the raster scanning direction. Therefore, the white pixel indicated by S is designated as the start point. The position vector of the white pixel S is represented as $IP=(3, 4)$. The raster-scanning direction at the start point is in the right-hand direction. Therefore, the unit vector $\Delta IP$ to be added to the position vector IP of the start point is decided to be a unit vector having a direction opposing the scanning direction. That is, $\Delta IP=(-1, 0)$.

After the tracing of the contour of the binary image has begun, the shift of the tracing point is carried out as follows. Four adjacent pixels positioned on upper, lower, left-hand and right-hand sides of the point of interest (four adjacent pixels) are sequentially checked in the clockwise direction, starting from one adjacent pixel which is positioned on the left-hand side at an angle of 90° with respect to a direction in which the trace proceeded towards the point of interest. In this checking operation, if the first checked pixel, i.e., the adjacent pixel positioned at an angle of 90° on the left-hand side with respect to the direction in which the tracing reached the point of interest is a white pixel, the tracing is shifted to this white pixel. Alternatively, if the first checked pixel is a black pixel, the next (or second) adjacent pixel in the clockwise direction is checked. If this pixel is a white pixel the tracing proceeds thereto, and alternatively if not a white pixel, the third adjacent pixel is checked. In this manner, the adjacent pixels are sequentially checked, and the first white pixel is detected.

The above processes correspond to a sequence of steps 103 to 107 in FIG. 5A. At step 103, the unit vector $\Delta IP$ is rotated in the counterclockwise direction by an angle of 90°. Then, a pixel represented by the vector $IP+\Delta IP$ is referred to and checked as to whether or not it is a white pixel (steps 104 and 105). If the result is affirmative, the process proceeds to step 107 at which the pixel indicated by the vector IP is registered as the tracing point. Alternatively, if the result is negative, the process proceeds to step 106 at which the unit vector $\Delta IP$ is rotated in the clockwise direction by an angle of 90°. Then, step 104 and a subsequent step 105 are carried out. In this manner, the tracing point subsequent to the point of interest is designated and registered. Subsequent to step 107, the current vector $IP+\Delta IP$ is inserted into the vector IP (step 108). Then, it is checked as to whether or not the tracing is completed (step 109). In other words, it is checked whether or not the tracing has returned to the start point. If the tracing is not completed, the tracing process returns to step 103 and the sequence of steps 103 to 109 is performed in the manner described above. Alternatively, if the tracing returns to the start point, it is terminated.

Figure 6A:
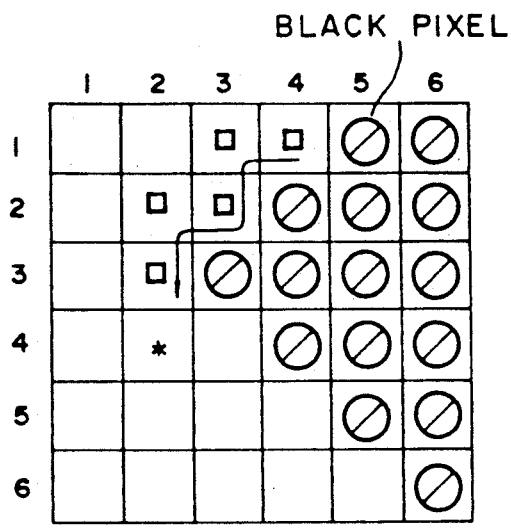
FIGS. 6A through 6C are views for explaining the process for assigning direction codes to the contour portion of the character image.
Figure 6B:
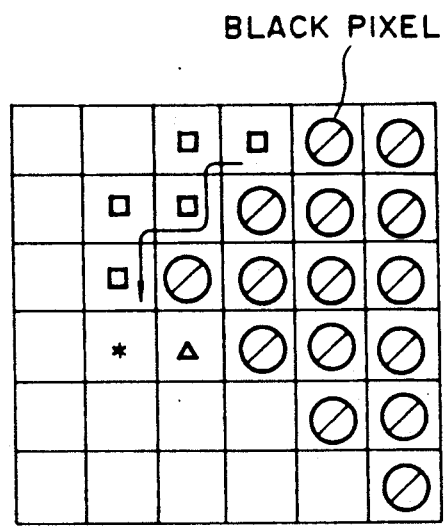
Figure 6C:
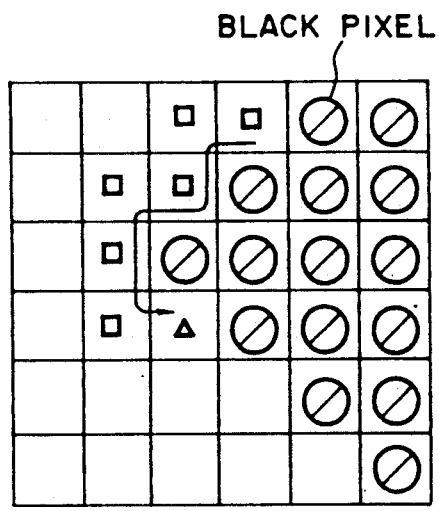

A concrete example of the above contour tracing process is shown in FIGS. 6A through 6C. FIG. 6A shows a state immediately before step 103 is carried out. A symbol □ denotes a registered tracing point. In the state shown in FIG. 6A, the pixel of interest $IP \leftarrow IP + \Delta IP$ at the position indicated by a symbol * is represented as $IP=(2, 3)$ and $\Delta IP=(0, 1)$. This corresponds to step 108 shown in FIG. 5A. With respect to this point of interest, the unit vector $\Delta IP$ is rotated in the counterclockwise direction by 90° (step 103), so that $\Delta IP=(1, 0)$ (right-hand direction). Then, a pixel at $IP+\Delta IP$ in which $IP=(2, 4)$ and $\Delta IP=(1, 0)$ is referred to (step 104). This pixel is located at the position indicated by a symbol $\Delta$ shown in FIG. 6B. Then, it is checked whether or not the pixel designated at step 104 is white pixel (step 105). In the illustrated example, the pixel at the position $\Delta$ is a white pixel. Therefore, the point of interest indicated by the symbol * is registered as the tracing point (step 107). Then, the point of interest is shifted to the position $\Delta$ (step 108). At this time, $IP=(2, 4)$ and $\Delta IP=(1, 0)$ (right-hand direction). In this manner, the direction code corresponding to the unit vector P is written in a storage region of the vector $\Delta P$ (the current tracing point) in the contour feature storing region 43.

STEP 1002

The CPU 20 refers to the feature quantities of the contour portion stored in the feature quantity storing region 42 (i.e., the two-dimensional contour feature image) and generates a projection of each of the different types of direction codes in the horizontal or vertical direction. This operation is controlled by the program 32 stored in the ROM 30 for generating the projection of each of the different types of the direction codes. The generated projection of each of the different types of the direction codes is stored in the region 44 provided in the RAM 40 for storing the projection of each of the direction codes.

Thereafter, the CPU 20 obtains a pair of region dividing lines for dividing the two-dimensional contour feature image by using the projection of each of the different types of the direction codes, and seeks positions at which the dividing lines intersect the contour feature image. The a pair of region dividing lines also divide the rectangular image region into three rectangular subregions. The obtained positions are registered in the reference position storing region 46 provided in the RAM 40. One of the obtained positions is a reference position with respect to the group of the feature quantities of the contour portion of the character. The above process is carried out by the CPU 20 in accordance with the reference position deciding program 33 stored in the ROM 30.

A description is now given of examples of the process for obtaining region dividing lines.

EMBODIMENT 1 OF STEP 1002

Embodiment 1 uses the projection of each of the different types of the direction codes in the horizontal direction. Positions at which the projection of the direction code #1 coincides with the projection of the direction code #3 are sought starting from each of the top and bottom of the rectangular image region. The first coincidence between the direction codes #1 and #3 viewed from the top of the rectangular image region is decided to be an upper region dividing line extending in the horizontal direction. Likewise the first coincidence between the direction codes #1 and #3 viewed from the bottom of the rectangular image region is decided to be a lower region dividing line extending in the horizontal direction.

Figure 7:
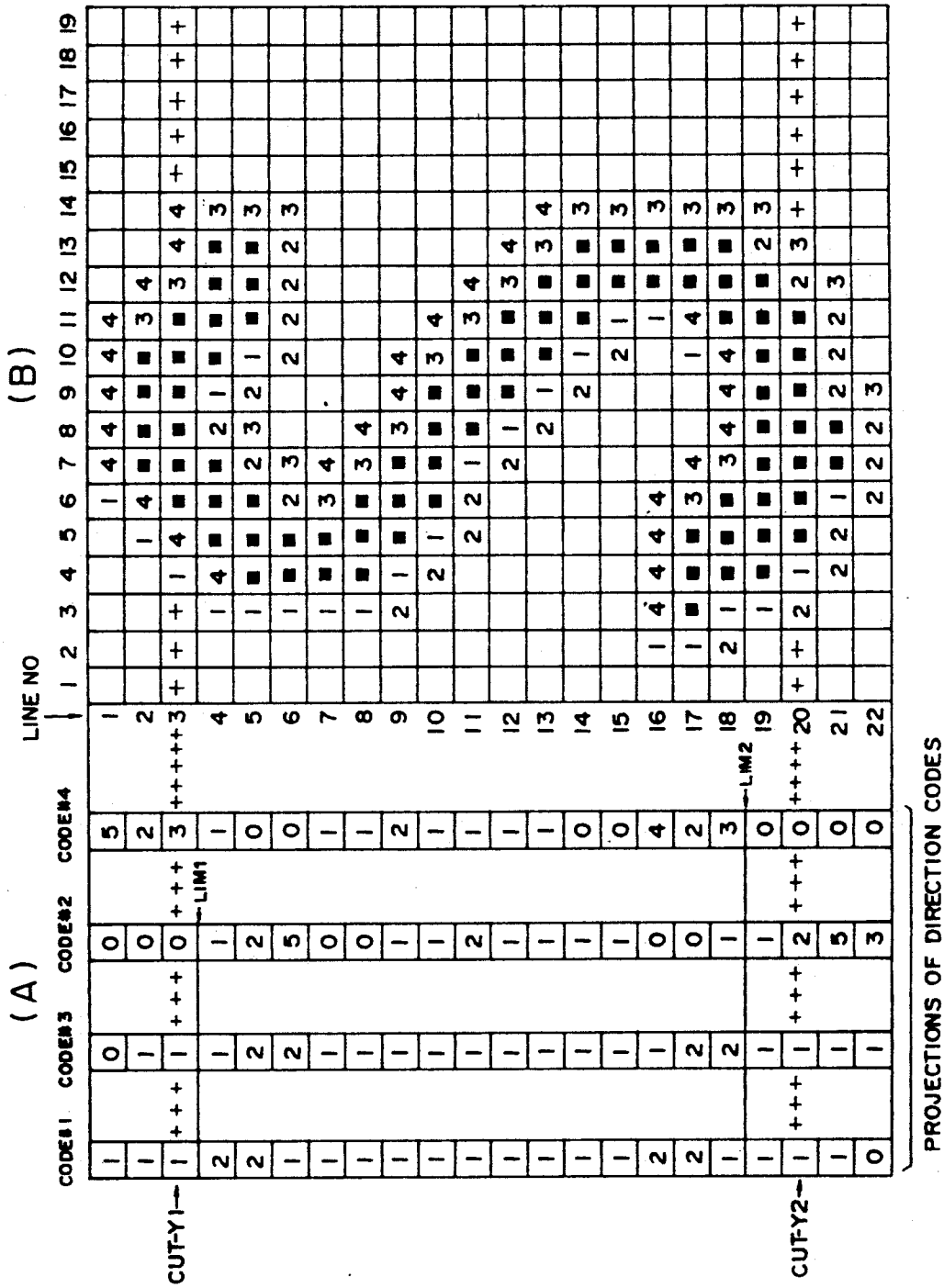
FIG. 7 is a view for explaining region dividing lines.

FIG. 7 is a view for explaining the embodiment 1. FIG. 7(B) shows an image pattern of a character "S" formed in the rectangular image region, along with direction codes obtained by tracing white pixels adjacent to black pixels of the contour portion of the character image in the counterclockwise direction. The illustrated direction codes indicate the group of the feature quantities of the contour part of the character "S" obtained by the scan. As described previously, the image formed by the two-dimensional arrangement of the direction codes is referred to as the two-dimensional contour feature image.

FIG. 7(A) shows projection of each of the direction codes #1 to #4 obtained by projecting the feature contour image in the horizontal direction. The projection can be obtained as follows. For example, with respect to the first line of the rectangular image region, the number of the direction codes #1, #2, #3 and #4 are 1, 0, 0, and 5, respectively. The counted number obtained for each of the different types of the direction codes indicates a respective projection value. Likewise, the projections with respect to the lines 2 to 22 can be obtained. In FIG. 7(A), CUT-Y1 and CUT-Y2 indicate region dividing lines on the upper and lower sides of the character image, respectively, which are obtained in the following manner. In FIG. 7(B), the projections of the direction codes #1 to #4 are shown.

Figure 8A:
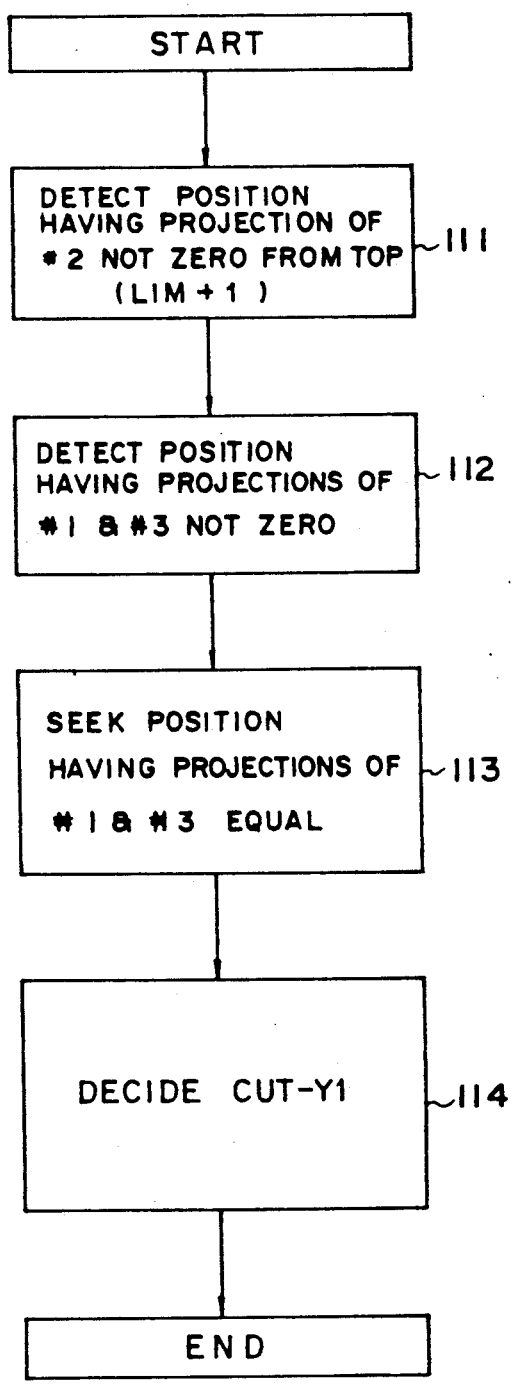
FIG. 8A and 8B are flowcharts of algorithm of a first embodiment for obtaining region dividing lines.
Figure 8B:
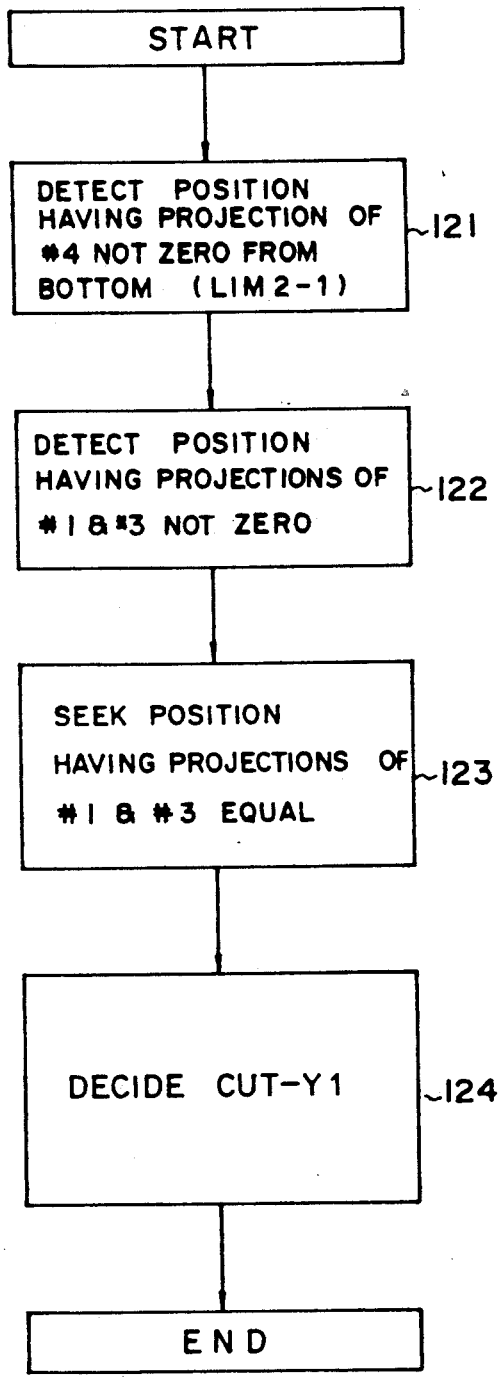

FIG. 8(A) is a flowchart of algorithm for obtaining the region dividing line CUT-Y1 on the upper side of the character image, and FIG. 8B is a flowchart of algorithm for obtaining the lower region dividing line CUT-Y2 on the lower side thereof. The algorithm for the region dividing line CUT-Y1 has a symmetrical relationship with the algorithm for the region dividing line CUT-Y2. A description is now given of the algorithm for the region dividing line CUT-Y1.

Step 111 of FIG. 8A is a step for deciding an end position of a range for seeking the region dividing line CUT-Y1. This step is for detecting a thickness of the character. In the example of FIG. 7(A), the first position where the value of the projection of the direction code #2 in the horizontal direction becomes equal to a value other than zero is located on the line 4. It is now assumed that the position of the projection o the direction code #2 on the line 4 thus obtained is represented by LIM1+1. Then the end position o the range for seeking the region dividing line CUT-Y1 is decided to be a position on the column of the direction code #2 preceding the position LIM1+1 by one line. The end position of the range thus obtained is represented by LIM1.

Step 112 is a step for deciding a start position of the range for seeking the region dividing line CUT-Y1. The step 112 is for obtaining a position at which both the values of the projections of the direction codes #1 and #3 projected in the horizontal direction become equal to values other than zero. The start position of the range thus obtained corresponds to the top end of the character image. In the example of FIG. 7(A), the line 2 is the start position of the range.

Steps 113 and 114 define a condition for deciding the region dividing line CUT-Y1. At step 113, a position at which the first coincidence between the values of the projections of the direction codes #1 and #3 is obtained is downwardly sought, starting from the line next to the line obtained at step 112, i.e., the line 3. Then, when the first coincidence is detected, a line having the first coincidence is detected is decided to be the region dividing line CUT-Y1 (step 113). In the example of FIG. 7(A), the line 3 is decided to be the region dividing line CUT-Y1, which is represented by the alignment of '+'. When the position satisfying the above condition is not found, a line having the end position LIM1 of the range is decided to be the region dividing line CUT-Y1 (step 114).

The algorithm for deciding the region dividing line CUT-Y2 on the lower side of the character region is now described by referring to FIG. 8B. At step 121, a position at which the value of the projection of the direction code #4 becomes equal to a value other than zero is sought, starting from the bottom of the region of FIG. 7(A). The detected position is represented by LIM2-1. A position LIM2 following the position LIM2-1 is determined to be an end position of a range for seeking the region dividing line CUT-Y2. Then at step 122, a position at which the values of the projections of the direction codes #1 and #3 in the horizontal direction become equal to values other than zero is obtained is upwardly sought, starting from the bottom of the region. The detected position at step 122 is the lowermost position of the character image. Thereafter, a position at which the first coincidence between the direction codes #1 and #3 is obtained is upwardly sought, starting from the line preceding the line obtained at step 122. When such a position is detected, a line having the detected position is determined to be the region dividing line CUT-Y2 (step 123). When such a position is not detected, the line having the end position LIM2 is decided to be the region dividing line CUT-Y2 (step 124).

The above condition for deciding the region dividing line has a function of coping with noise contained in the character image. FIGS. 9A through 9C are views for explaining the above function. FIG. 9A is with respect to a case where the character image does not have any noise, and FIGS. 9B and 9C are with respect to cases where the character image have noise. Noise contained in the character image of FIG. 9B is located at positions (x, y)=(10, 3) and (11, 3), and noise contained in the character image of FIG. 9C is located at positions (6, 2) and (11, 2). It can be seen from FIGS. 9B and 9C that the algorithm of FIG. 8A can decide the appropriate position of the region dividing line CUT-Y1 without being affected by the presence of noise contained in the top end of the character image. In FIG. 9B, the region dividing line CUT-Y1 is located on the line 3, and the region dividing line CUT-Y1 of FIG. 9C is located on the line 3. It will be seen from the above explanation that the region dividing line CUT-Y2 can be obtained without being affected by the present of noise contained in the bottom end of the character image.

Figure 10A:
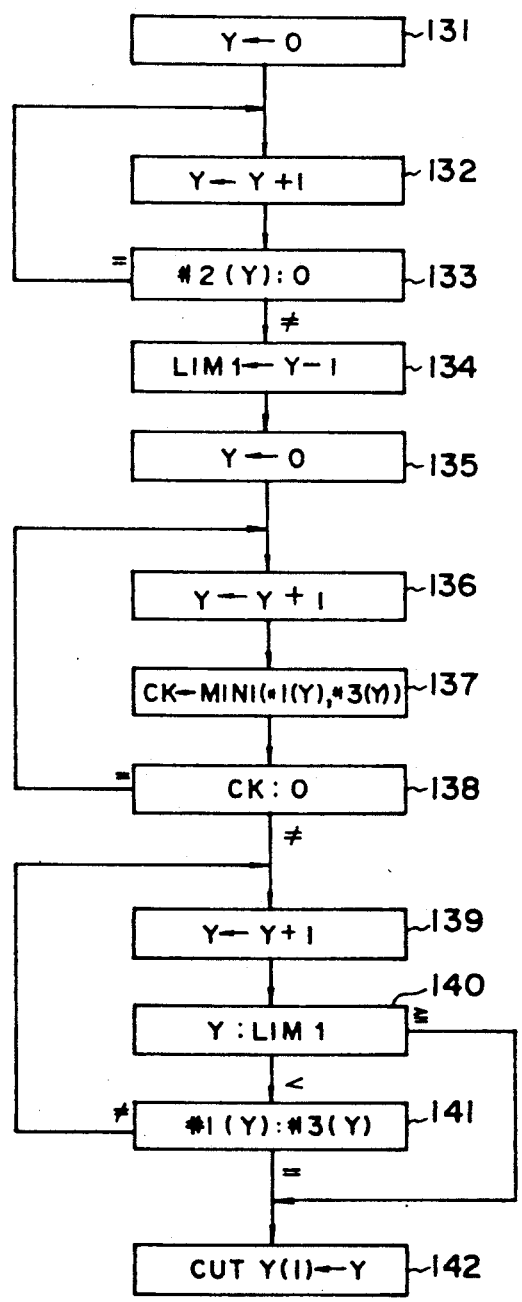
FIGS. 10A and 10B are detailed flowcharts of FIGS. 8A and 8B, respectively.
Figure 10B:
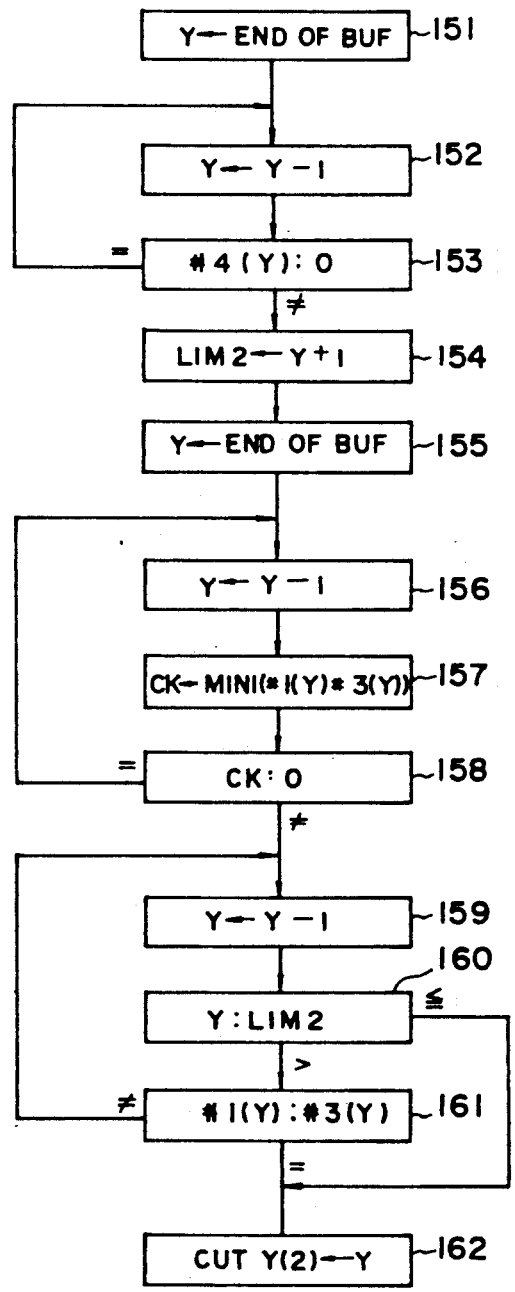

FIG. 10A is a detailed flowchart of the algorithm for deciding the region dividing line CUT-Y1 shown in FIG. 8A, and FIG. 10B is a detailed flowchart of the algorithm for deciding the region dividing line CUT-Y2 shown in FIG. 8B. A loop composed of steps 132 and 133, a loop composed of steps 136 to 138, and a loop composed of steps 139 to 141 of FIG. 10A correspond to steps 111, 112 and 113 of FIG. 8A, respectively. A loop composed of steps 152 and 153, a loop composed of steps 156 to 158, and a loop composed of steps 159 to 161 of FIG. 10B correspond to steps 121, 122 and 123 of FIG. 8B, respectively. In FIGS. 10A and 10B, "Y" denotes Y'th line (row) of the rectangular region containing the character image, and "#1(Y)", "#2(Y)" and "#3(Y)" denote values of the projections of the direction codes #1, #2 and #3. "END OF BUF" denotes the least significant address of the generated projection.

In FIG. 10A, a value of 0 is set in Y at step 131. Then Y is is incremented by 1 at step 132. Then the value of the #2(Y) is compared with a value of 0 at step 133. A symbol ":" indicates comparison. When both the values are equal to each other, the process returns to step 132. If not, LIM1 is set to Y-1 at step 134 and Y is set to a value of 0. In the example of FIG. 7, the end position LIM1 is decided to be on the line 3 (LIM1=3) at step 134. At step 136, Y is incremented by 1, and CK is set to MINI(#1(Y), #3(Y)) at step 137. An operator MI- NI(#1(Y), #3(Y)) denotes selection of smaller one out of #1(Y) and #3(Y), and "CK" is a working region. At step 138, the value of CK is compared with 0. When both the values are not equal to each other, the process returns to step 136. Adversely, when both the values are equal to each other, the process proceeds to step 139. In the example of FIG. 7, the line 2 at which the values of the projections of the direction codes #1 and #3 are not zeros is detected at step 138. Thereafter, Y is incremented by 1 at step 139. Then, Y is compared with LIM1 at step 140. When LIM1 is greater than Y, #1(Y) is compared with #3(Y) at step 141. When both the values are not the same, the process returns to step 139. Alternatively when both the values are equal to each other, the process proceeds to step 142. When Y is greater than LIM1 at step 140, the process also proceeds to step 142. At step 142, a line having the current value of Y is decided to be the region dividing line CUT-Y1.

Steps 151 through 162 of FIG. 10B will be obvious from the description regarding the algorithm of FIG. 10A. Therefore, a detailed description of FIG. 10B is omitted.

EMBODIMENT 2 OF STEP 1002

Embodiment 2 uses the horizontal projection of each of the direction codes #1 to #4 as in the case of the embodiment 1 described before. The embodiment 2 directs attention to the direction codes #2 and #4 indicating the horizontal directions.

Figure 11:
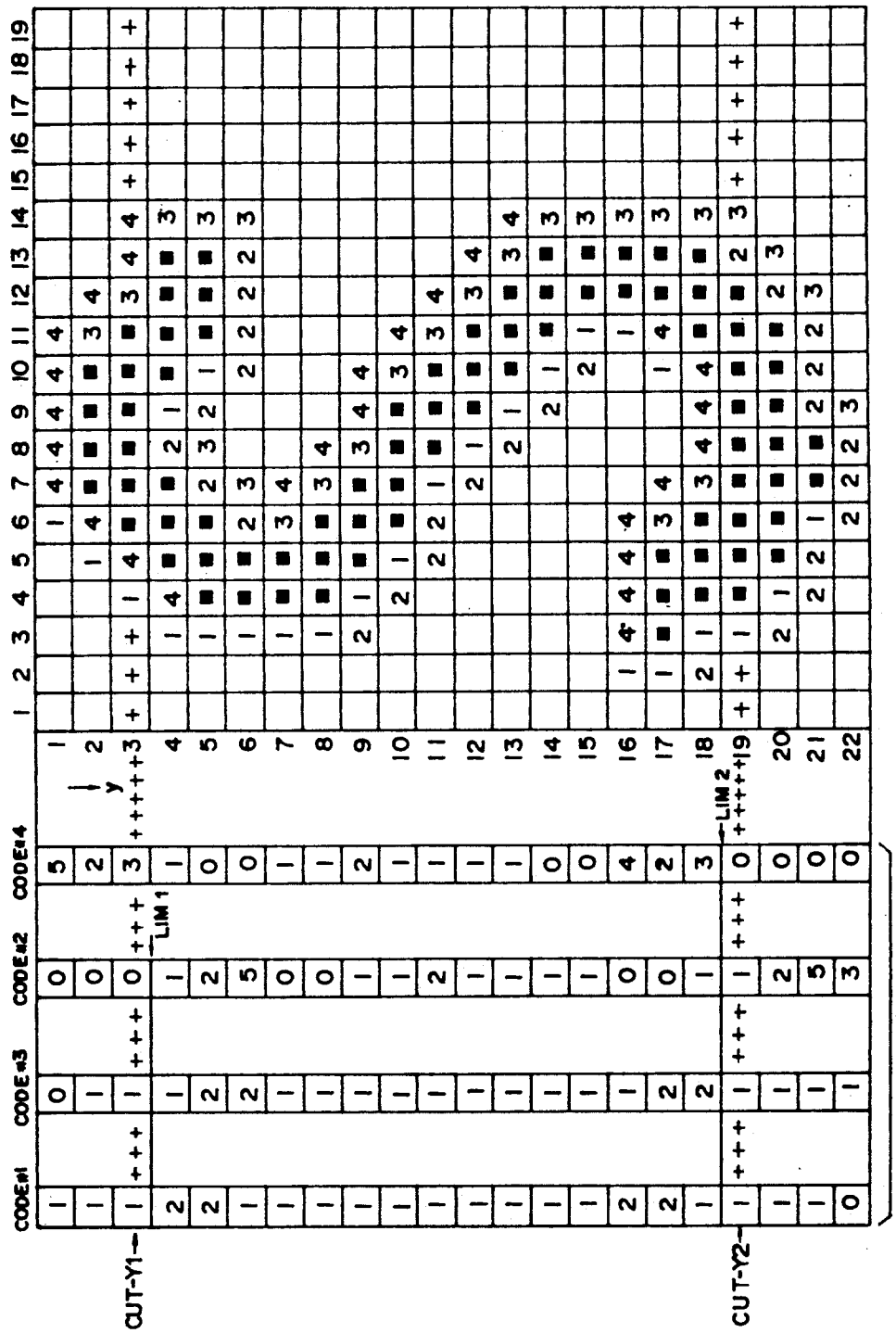
FIG. 11 is a view for explaining region dividing lines obtained by algorithm of a second embodiment for obtaining region dividing lines.
Figure 12A:
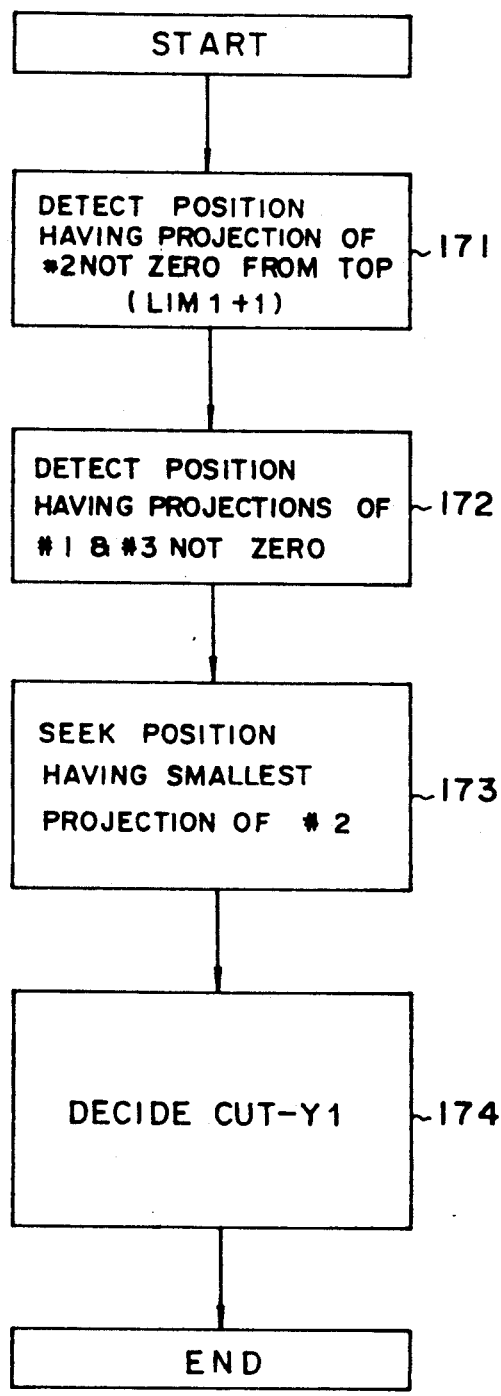
FIGS. 12A and 12B are flowcharts of algorithm of the second embodiment.
Figure 12B:
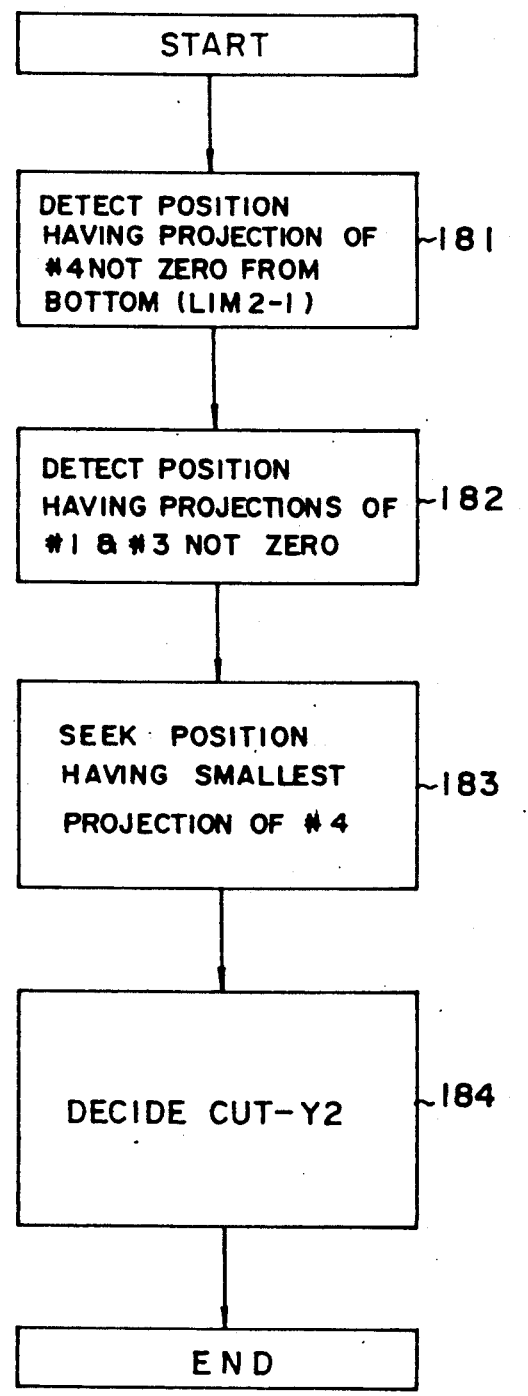

FIG. 11 is a view for explaining the embodiment 2, FIG. 12A is a flowchart of algorithm for deciding the region dividing line CUT-Y1 on the upper side of the character image, and FIG. 12B is a flowchart of algorithm for deciding the region dividing line CUT-Y2 on the lower side of the character image. In FIG. 12A, steps 171 and 172 are steps for obtaining a range within which the region dividing line CUT-Y1 is sought. Step 173 and 174 define a condition for deciding the region dividing line CUT-Y1. Steps of FIG. 12B corresponding to steps of FIG. 12A have the same function.

At step 171 of FIG. 12A, a position at which the value of the horizontal projection of the direction code #2 becomes equal to a value other than zero is sought, starting from the top of the rectangular region shown in FIG. 11(A). This position corresponds to LIM1+1. Then at step 172, a position at which the value of the horizontal projection of each of the direction codes #1 and #3 becomes equal to a value other than zero is sought, starting from the top of the rectangular region. Thereafter, at step 173, a position at which there is obtained the smallest value of the projection of the direction code #2 is downwardly sought in the range from the position next to the position obtained at step 172 to the end position LIM1 of the range. When such a position is detected at step 173, the line having the detected position is decided to be the region dividing line CUT-Y1 (step 174). If the position is not detected at step 173, the line having the end position LIM1 is decided to be the region dividing line CUT-Y1 (step 174).

In FIG. 12B, at step 181, a position at which the value of the horizontal projection of the direction code #4 becomes equal to a value other than zero is sought starting from the bottom of the rectangular region. The found position corresponds to the position LIM2-1. Then, at step 182, a position at which the value of the horizontal projection of each of the direction codes #1 and #3 becomes equal to a value other than zero is sought, starting from the bottom of the rectangular region. Thereafter, at step 183, a position at which there is obtained the smallest value of the projection of the direction code #4 is upwardly sought in the range from the position next to (above) the position obtained at step 182 to the end position LIM2. When such a position is detected at step 183, the line having the detected position is decided to be the region dividing line CUT-Y2 (step 184). Alternatively when the position is not detected at step 183, the line associated with the end position LIM2 is decided to be the region dividing line CUT-Y2 (step 184).

In this manner, the upper region dividing line CUT-Y1 located on the line 3 and the lower region dividing line CUT-Y2 located on the line 19 are obtained.

EMBODIMENT 3 OF STEP 1002

Embodiment 3 uses projection of each of the direction codes #1 to #4 in the vertical direction. In embodiment 3, a position at which there is obtained the first coincidence between the values of the direction codes #2 and #4 is sought from the right and left-hand ends of the rectangular region.

FIG. 13A is a flowchart of algorithm for deciding a region dividing line positioned on the left-hand side of the rectangular region, and FIG. 13B is a flowchart of algorithm for deciding a region dividing line positioned on the right-hand side of the rectangular region. The algorithm of FIG. 13A comprises steps 191 through 194, and the algorithm of FIG. 13B comprises steps 201 through 204. The embodiment 3 corresponds to algorithm obtained by applying the algorithm of the embodiment 1 described before to the decision of the region dividing lines in the vertical direction. Therefore, the algorithm of FIG. 13A and 13B is obtained by simply exchanging "top" and "bottom" of FIGS. 8A and 8B with "left" and "right" and exchanging "#1" and "#3" with "#2" and "#4", respectively. For this reason, an explanation of FIGS. 13A and 13B is omitted here.

EMBODIMENT 4 OF STEP 1002

Embodiment 4 uses the vertical projection of each of the direction codes #1 to #4 as in the case of the embodiment 3. Embodiment 4 directs attention to the direction codes #1 and #3. The embodiment 4 seeks a position where the smallest value of the vertical projection of the direction code #1 is within a range for seeking the region dividing line positioned on the left-hand side of the rectangular region, starting from the left-hand end of the rectangular region. And the embodiment 4 seeks a position at which the smallest value of the vertical projection of the direction codes #3 is within a range for seeking the region dividing line positioned on the right-hand side of the rectangular region, starting from the right-hand end of the rectangular region.

Figure 14A:
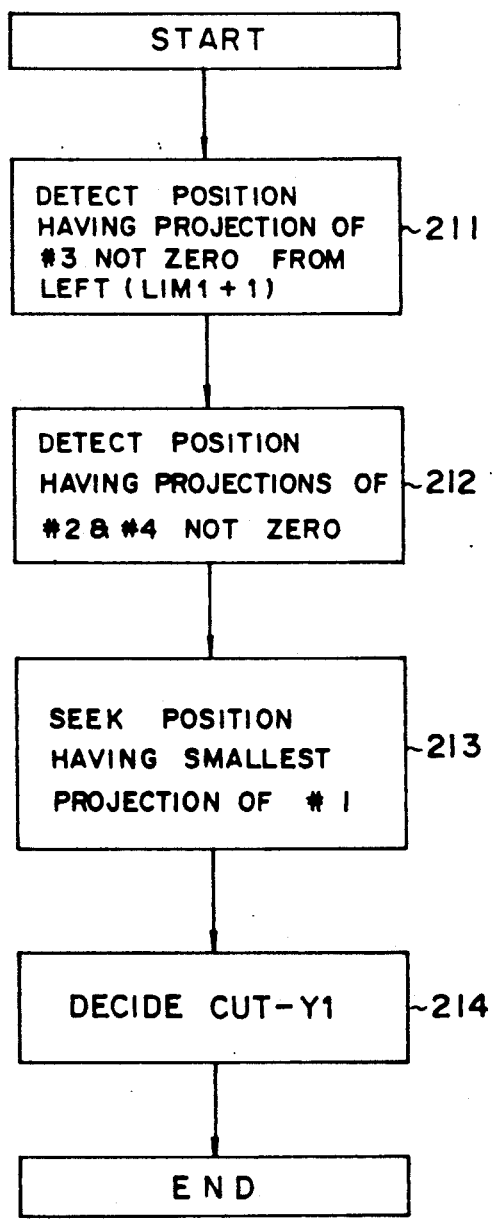
FIG. 14A and 14B are flowcharts of algorithm of a fourth embodiment for obtaining region dividing
Figure 14B:
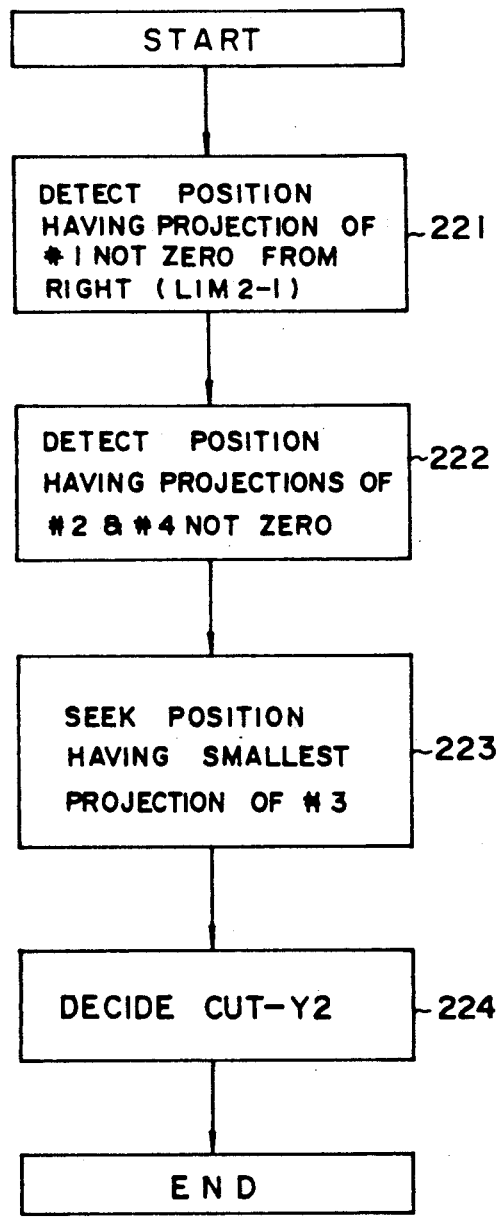

FIG. 14A is a flowchart of algorithm for deciding the region dividing line on the left-hand side of the rectangular region, and FIG. 14B is a flowchart of algorithm for deciding the region dividing line on the right-hand side of the rectangular region.

Steps 211 and 212 of FIG. 14A are the same as steps 191 and 192 of FIG. 13A. That is, step 211 seeks a position where the value of the vertical projection of the direction code #3 becomes equal to a value other than 0, starting from the left-hand end of the rectangular region. The found position corresponds to LIM1+1. Therefore, the end of the range for obtaining the region dividing line on the left-hand side is the position LIM1. Then, at step 212, a position is sought at which both the value of the projections of the direction codes #2 and #4 become equal to values other than zero. Step 213 seeks, in the right-hand direction, a position at which the smallest value of the projection of the direction code #1 is obtained within a range between the line following (in the right-hand direction) the position obtained at step 211 and the position LIM2. Then, at step 214, a line having the detected position is decided to be the region dividing line on the left-hand side.

Steps 221 and 222 of FIG. 14A are the same as steps 201 and 202 of FIG. 13B. Step 223 seeks, in the left-hand direction, a position where the smallest value of the projection of the direction code #3 is obtained within the range between the line following (in the left-hand direction) the position obtained at step 221 and the position LIM2. Then, at step 224, a line having the detected position is decided to be the region dividing line on the right-hand side.

The embodiments 1 through 4 refer to the case where the feature quantities of the contour portion are represented by the direction codes #1 to #4. However, the embodiments 1 through 4 are not limited to the processing of the contour feature image represented by the direction codes and are applicable to cases where conventional codes other than the direction codes are used.

STEP 1003 (FIG. 2)

The CPU 20 corrects the start point for the contour tracing by referring to the region dividing line CUT-Y1 obtained at step 1002 described before. The CPU 20 carries out this correction in accordance with the program 34 for correcting the start point for the contour tracing stored in the ROM 30. The CPU 30 finds a position at which the region dividing line CUT-Y1 intersects the contour feature image. The found position is a corrected start point for the contour tracing. The corrected start point indicates a reference position for the feature extraction of the unknown character. Then, a sequence of the direction codes stored in the direction code storing region 43 is rearranged so that the sequence of the direction codes starts from the corrected start point.

Figure 15A:
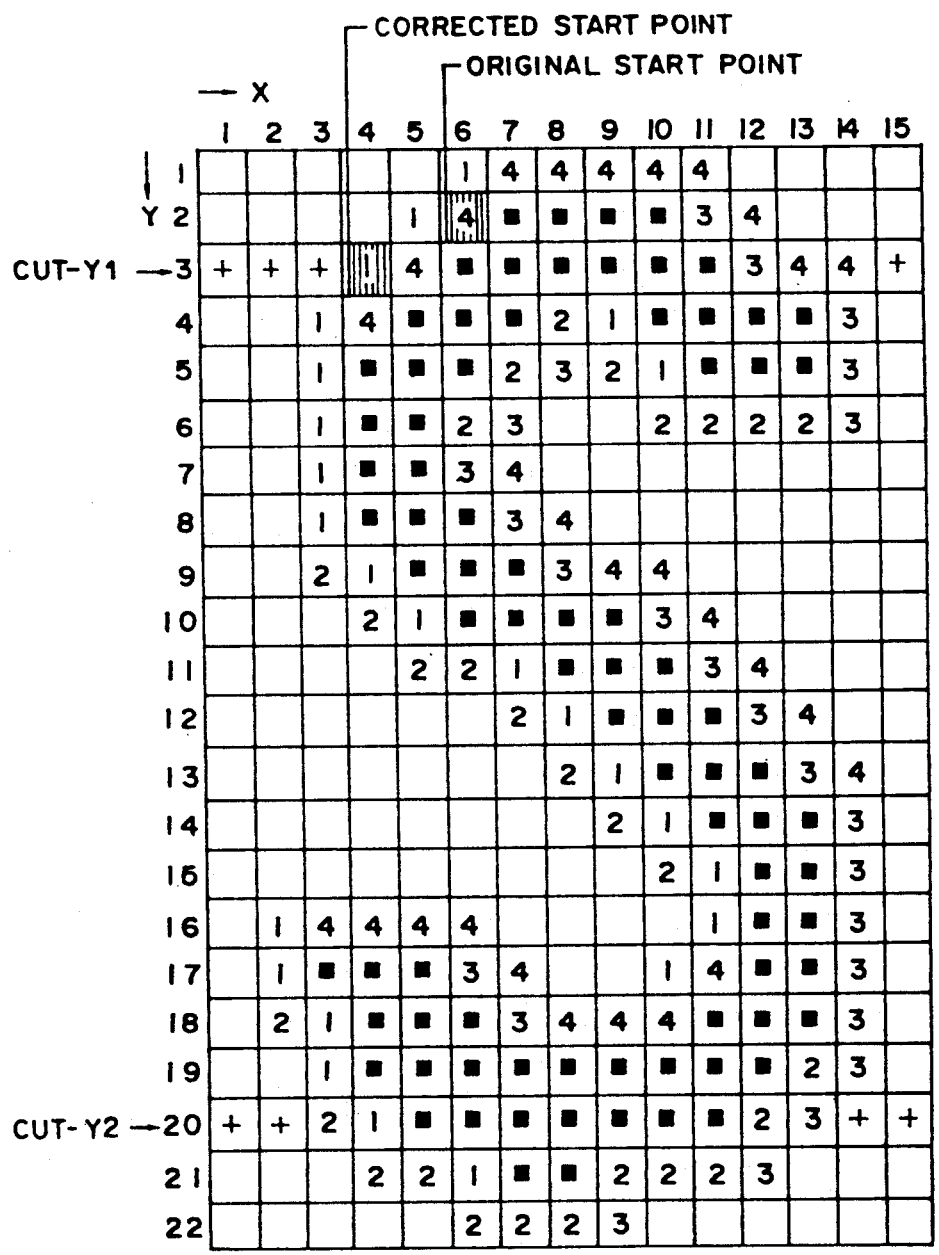
FIG. 15A is a view for explaining correction of the start point obtained by the raster-scan of the character image.
Figure 15B:
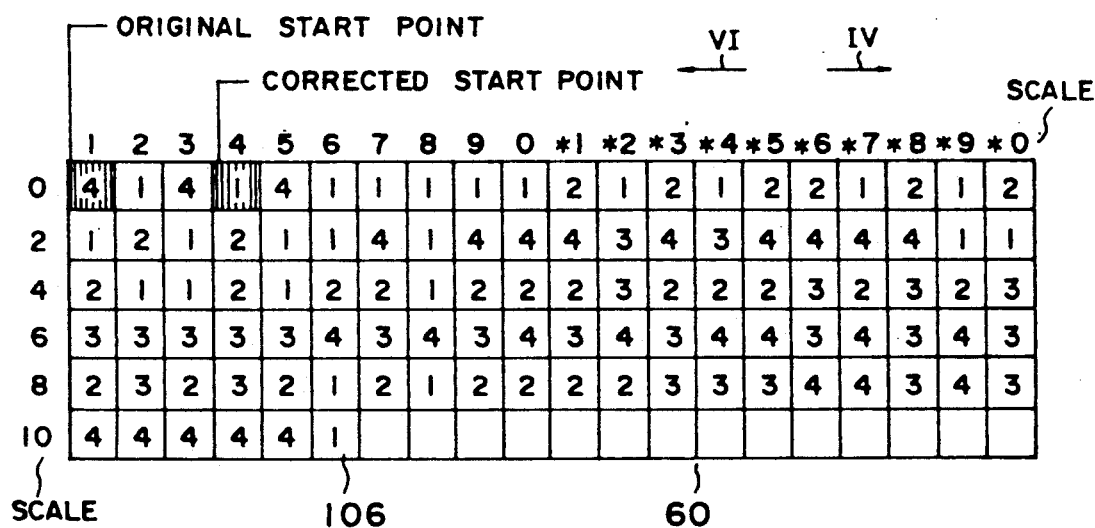
FIG. 15B is a view showing a sequence of direction codes stored in a direction code storing region.

FIG. 15A is a view for explaining step 1003. The rectangular region of FIG. 15A is the same as that of FIG. 7(A). The coordinates of the start point obtained at step 1001 are (x, y)=(6, 2) as shown in FIG. 15A. In this case, a sequence of the direction codes starting from the start point is stored in the direction code storing region 43 in the sequence of appearance of the direction codes as shown in FIG. 15B. In FIG. 15B, a reference numeral 60 indicates the direction code storing region 43, and numerals which are attached to the region 43 and are aligned in the horizontal and vertical direction are used for indicating a position in the region 43. In the illustrated example, the region dividing line CUT-Y1 intersects the contour feature image at the coordinates (4, 3) of the rectangular region. Therefore, the coordinates (4, 3) are determined as the corrected start point. Then, the sequence of the direction codes shown in FIG. 15B is rearranged so that the rearranged sequence of the direction codes starts from the corrected start point. The rearrangement of the direction codes stored in the shift direction code storing region 43 can form the sequence of the direction codes which starts for the correct start point without being affected by noise and the like.

A description is now given of embodiments of algorithm for obtaining the corrected start point for the contour tracing.

EMBODIMENT 1 OF STEP 1003

Embodiment 1 decides a direction in which the sequence of the direction codes is to be traced, starting from the original start point obtained at step 1001 by comparing the y coordinate of the region dividing line CUT-Y1 with the y coordinate of the start point obtained at step 1001, and finds the position of the corrected start point in the direction code storing region 43 by tracing the sequence of the direction codes in the decided direction.

Figure 16:
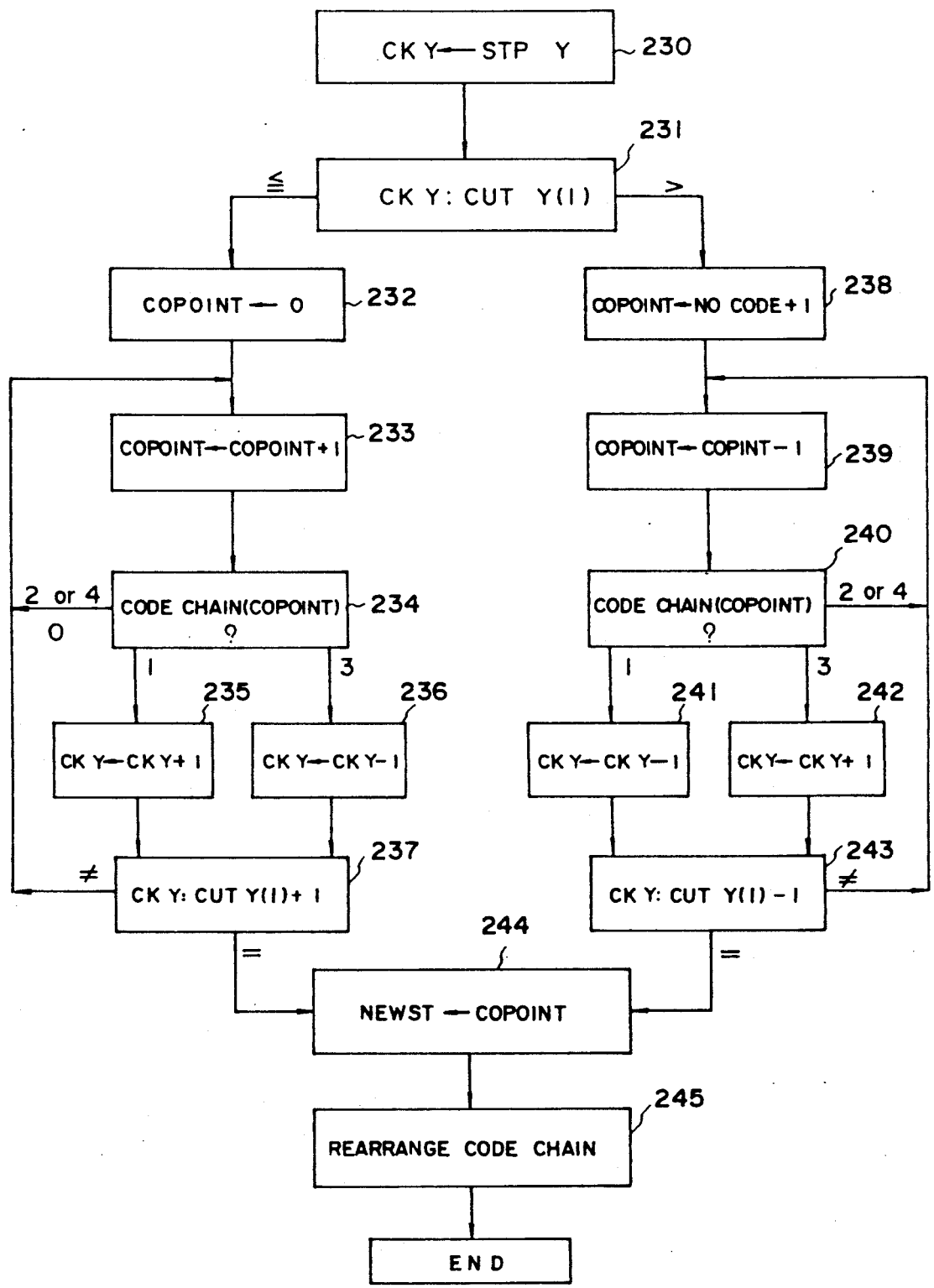
FIG. 16 is a flowchart of algorithm of a first embodiment for correcting the start point.

FIG. 16 is a detailed flowchart of step 1003 of the algorithm for correcting the start point for the contour tracing. Symbols used in the algorithm have the following meanings.

CK Y: a variation indicating a value of the y coordinate of the rectangular region.

STP Y: a value of the y coordinate of the original start point.

CUT Y(1): a value of the y coordinate of the region dividing line positioned on the upper side of the character image.

COPOINT: a pointer for indicating a position of a direction code in the sequence stored in the direction code storing region 43 which stores the direction codes in the sequence of appearance thereof.

NO CODE: the number of direction codes which exist in the direction code storing region 43.

CODE CHAIN(*): a direction code stored in a position indicated by COPOINT.

NEWST: a position in the direction code storing region at which the corrected start point is stored.

At step 230 of FIG. 16, CK Y is set to a value of the y coordinate of the original start point STP Y obtained at step 1001 of FIG. 2. Then, at step 231, the value CK Y of the y coordinate of the start point is compared with the value CUT Y(1) of the y coordinate of the region dividing line CUT-Y1. When the value of the y coordinate of the start point CK Y is smaller than that of the y coordinate of the region dividing line CUT Y(1), the process proceeds to step 232. Alternatively, when CK Y is larger than CUT Y(1), the process proceeds to step 238. A sequence composed of steps 232 through 237 is with respect to a case where the original start point is positioned on or above the region dividing line CUT-Y1, and a sequence composed of steps 238 through 243 is with respect to a case where the original start point is positioned below the region dividing line CUT-Y1. The sequence composed of steps 232 through 237 intends to obtain the position of the corrected start point by tracing the sequence of the direction codes in the forward direction indicated by an arrow of IV in FIG. 15B. The sequence composed of steps 238 through 243 intends to obtain the corrected start point by tracing the sequence of the direction codes in the reverse direction indicated by an arrow of VI in FIG. 15B.

At step 232, the pointer COPOINT is set to a value of 0. Then the COPOINT is incremented by 1 at step 233. Subsequently at step 234, it is checked which direction code is stored at a position indicated by COPOINT. When the direction code #2 or #4 is found, the process returns to step 233. When the direction code #3 is found at step 234, the process proceeds to step 236. When the direction code #4 is found at step 234, the process proceeds to step 237. At step 235, the current value of the y coordinate is incremented by 1. At step 236, the current value of the y coordinate is decremented by 1. Then at step 237, CK Y is compared with CUT Y(1) +1. That is, the value of the y coordinate determined at step 235 or 236 is compared with the value of the y coordinate of the line following the region dividing line CUT-Y1. When both the values are different from each other, the process returns to step 233. Alternatively, when both the values are the same, the process proceeds to step 244. Then the current position in the direction code storing region 43 indicated by COPOINT is set as the position of the corrected start point NEWST. Then at step 245, the sequence of the direction codes stored in the direction code storing region 43 is rearranged so that the rearranged sequence of the direction codes starts from the corrected start point determined at step 244. In the sequence of FIG. 15B, the rearranged sequence of the direction codes starts from the position 4, in which the direction code #1 is stored. The direction codes #4, #1 and #4 preceding the direction code #1 positioned at the corrected start point are shifted in this sequence so as to follow the direction code #1 positioned at the position 106.

On the other hand, at step 231, when the value CK Y of the y coordinate of the start point is larger than the value CUT Y(1) of the y coordinate of the region dividing line, the process proceeds to step 238. At step 238, the pointer COPOINT is decremented by 1. Then at step 240, it is checked which direction code is stored at the position indicated by the pointer COPOINT. When the direction code #2 or #4 is found, the process returns to step 239. When the direction code #1 is found at step 240, the process proceeds to step 241, where the value of the y address is decremented by 1. When the direction code #3 is found, the process proceeds to step 242, at which the value of the y address is incremented by 1. Then, at step 243, the value of the y address determined at step 241 or 242 is compared with a value CUT Y(1)−1 of the line just prior to the region dividing line CUT-Y1. When both the values are not the same as each other at step 243, the process returns to step 239. When both the values are identical to each other, the process proceeds to step 244.

A further description is given of the flowchart of FIG. 16, referring to the example of FIG. 15A.

At step 230, CK Y is set to the STP Y having a value of 2. At step 231, when the y coordinate CK Y having a value of 2 is smaller than the y coordinate of the region dividing line CUT Y(1) having a value of 3, the process proceeds to step 232. The COPOINT is set to a value of 0 at step 232, and then COPOINT is incremented by 1 at step 233. Because CODE CHAIN(1) indicates the direction code #4, the process returns to step 233, and it is checked which direction code is stored at the position 2 (COPOINT=2) of the direction storing region 43. CODE CHAIN(2) indicates the direction code #1 and therefore the y coordinate CK Y having a value of 2 is incremented by 1 at step 235, so that the y coordinate CK Y having a value of 3 is obtained. Then at step 237, the CK Y having a value of 3 is compared with the CUT Y(1)+1 having a value of 4. Because both the values are not the same, the process returns to step 233 and it is checked which direction code is stored at the position 3 (COPOINT=3) at step 234. The direction code #4 is stored at the position 3, and therefore step 233 is carried out. Then it is checked which direction code is stored at the position 4 at step 234. The direction code #1 is stored in the position 4 and therefore the value of the y address is incremented by 1 at step 235, so that CK Y=4 is obtained. At this time, the value of CK Y becomes equal to the value of CUT Y(1) +1. Consequently at step 244, the position 4 in the direction code storing region 43 is decided to be the corrected start point. Then the rearrangement of the direction codes is carried out at step 245.

As can be seen from the above description of the algorithm of FIG. 16, variation in the y coordinate is calculated by tracing the direction codes. At step 234 regarding the forward scanning direction, when the direction code #1 is detected, the tracing point proceeds downwards to the adjacent line, and therefore the value of the y coordinate is incremented by 1. At step 236, when the direction code #3 is detected, the tracing point proceeds upwards to the adjacent line, and therefore the value of the y coordinate is decremented by 1. On the other hand, at step 240 regarding the reverse scanning direction, when the direction code #1 is detected, the tracing point proceeds upwards to the adjacent line, and therefore the value of the y coordinate is decremented by 1. At step 240, when the direction code #3 is detected, the tracing point proceeds downwards to the adjacent line, and therefore the value of the y coordinate is incremented by 1.

Regarding steps 237 and 243, the current value of the y coordinate is compared with CUT Y(1)+1 and CUT Y(1)−1, respectively, because the direction codes indicate the shift directions towards the next tracing point.

EMBODIMENT 2 OF STEP 1003

In embodiment 2 of step 1003, the direction codes along with values of corresponding y coordinate are stored in the direction code storing region 43. The direction in which the sequence of the direction codes stored in the region 43 is traced is decided by comparing the y coordinate of the original start point with the position at which the region dividing line CUT-Y1 intersects the contour feature image. Then the position of the corrected start point is obtained by scanning the stored values of the y coordinate.

Figure 17:
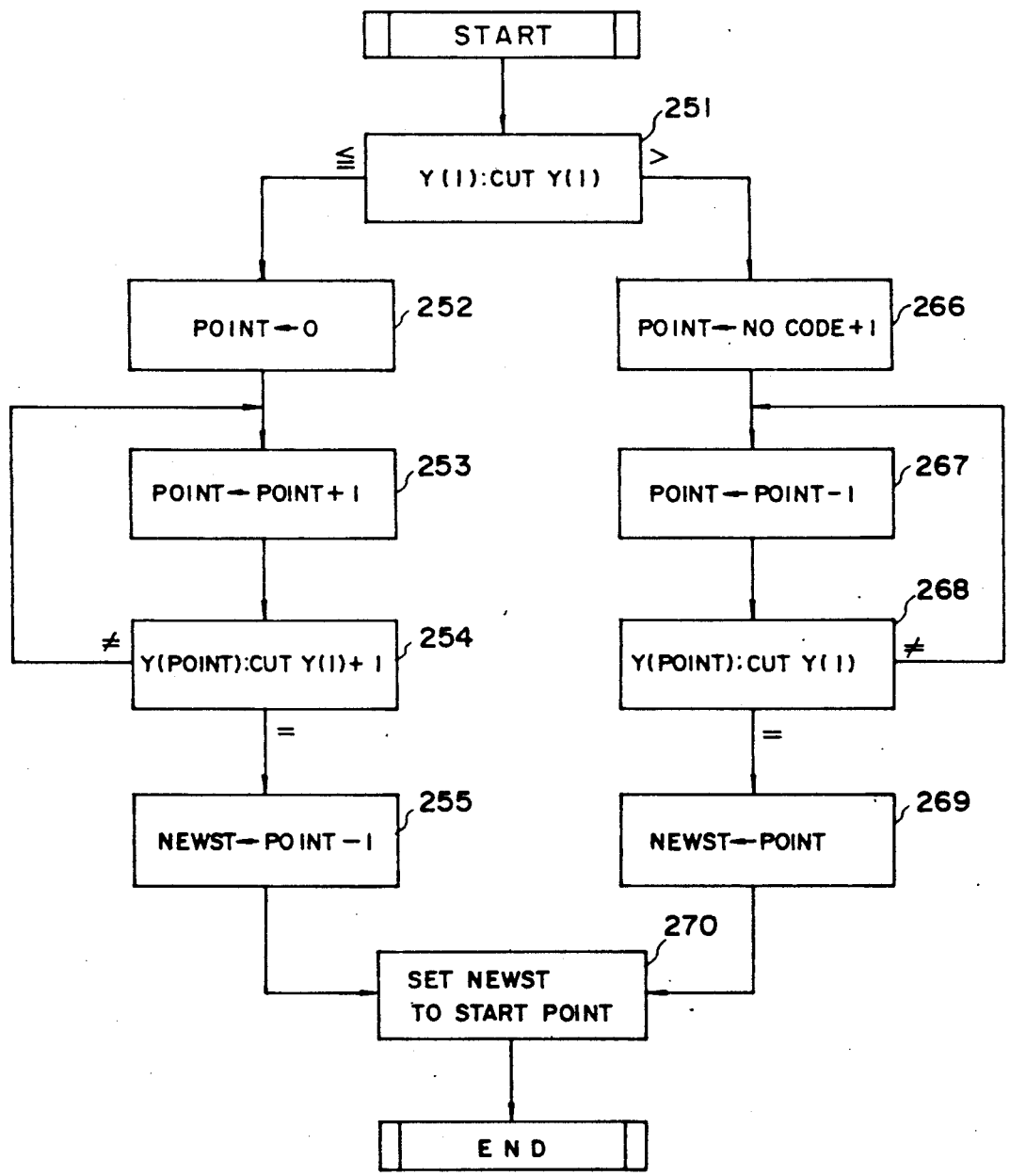
FIG. 17 is a flowchart of algorithm of a second embodiment for correcting the start point.

FIG. 17 is a flowchart of algorithm for correcting the start point for the contour tracing of the embodiment 2 of step 1003. In FIG. 17, Y(*) denotes a region in which the y coordinate is stored, and POINT is a pointer having the same as the COPOINT and denotes a pointer common to Y(*) and CODE CHAIN(*). In FIG. 17, the y coordinate having a value of 1, Y(1) is compared with the y coordinate CUT Y(1) of the region dividing line CUT-Y1 at step 251. When the value of Y(1) is equal to or smaller than the value of CUT Y(1), the process proceeds to step 252. Alternatively when the value of Y(1) is larger than the value of CUT Y(1), the process proceeds to step 266. A sequence composed of steps 252 through 255 is related to the case where the sequence is traced in the forward direction in order to obtain the corrected start point. A sequence composed of steps 266 through 269 is related to the case where the sequence is traced in the reverse direction in order to obtain the correct start point.

At step 252, the pointer POINT is set to a value of 0, and the pointer POINT is incremented by 1 at step 253. Then at step 254, the value of the y coordinate designated by the pointer POINT is compared with the value of the y address of the line CUT Y(1)+1 following the region dividing line CUT-Y1. When both the values are not the same as each other, the process returns to step 253. Adversely when the both the values are equal to each other at step 254, the process proceeds to step 255. At step 255, a position obtained by subtracting a value of 1 from the current position designated by the pointer POINT is decided to be the position of the corrected start point.

At step 266, a value is obtained by adding a value of 1 to the number (NO CODE) of direction codes stored in the direction code storing region 43. Then at step 267 the pointer is decremented by 1, and the value of the y coordinate is compared with the value CUT Y(1) of the y coordinate of the region dividing line CUT Y1 at step 268. When both the values are not the same as each other, the process returns to step 267. Alternatively when both the values are identical to each other at step 268, the process proceeds to step 269, where the current position indicated by the pointer POINT is decided to be the corrected start point. Then at step 270, the sequence of the direction codes stored in the direction code storing region 43 is rearranged so that the rearranged sequence starts from the corrected start point.

A further description is given of the algorithm of FIG. 17 in relation to the example of FIG. 15A. At step 251, Y(1)=1 and CUT Y(1)=3, and therefore the process proceeds to step 252. At step 252 POINT=0, and at step 253 POINT=1. Then, Y(1) is compared with cut Y(1)+1 at step 254. Since both the values are not the same as each other, the process returns to step 253, at which POINT=2 is obtained. Then step 254 is performed. At step 254, Y(2)=2 and CUT Y(1)=4, and therefore step 253 is performed. Then at step 254, Y(3)=3 and therefore step 253 is carried out. At step 254 Y(4)=4 and therefore both the values are identical to each other. Hence step 255 is performed, so that the position 3 is decided to be the corrected start point. Then the rearrangement of the sequence of the direction codes is carried out so that the rearranged sequence starts from the position 3 in the direction code storing region 43.

EMBODIMENT 3 OF STEP 1003

Embodiment 3 intends to cope with an error which may occur in obtaining the corrected start point. In the embodiment 3, the raster-scan of the rectangular region is performed two times. At the first time of the raster-scan, the scan starts from the top of the rectangular region. Then the start point is decided. Then at the second time of the raster-scan, the raster-scan is carried out, starting from a line positioned two lines below the line containing the decided start point. Then a start point is detected by the second raster-scan. A description is given of examples of the embodiment 3.

Figure 18A:
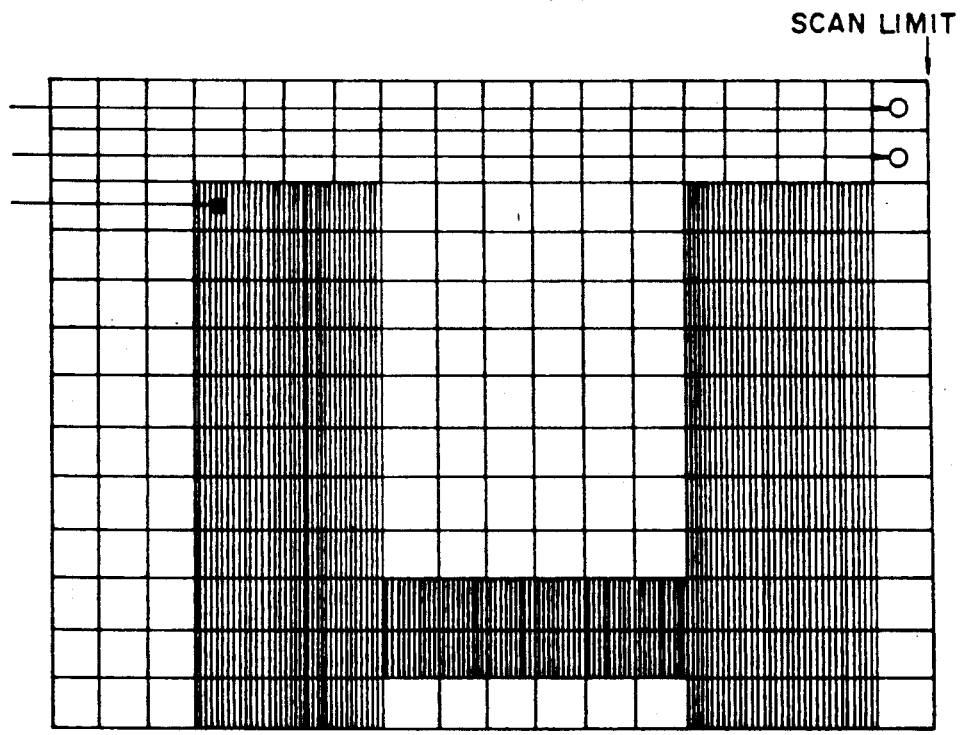
FIGS. 18A and 18B are views for explaining an error arising from the presence of noise contained in the contour image of a character.
Figure 18B:
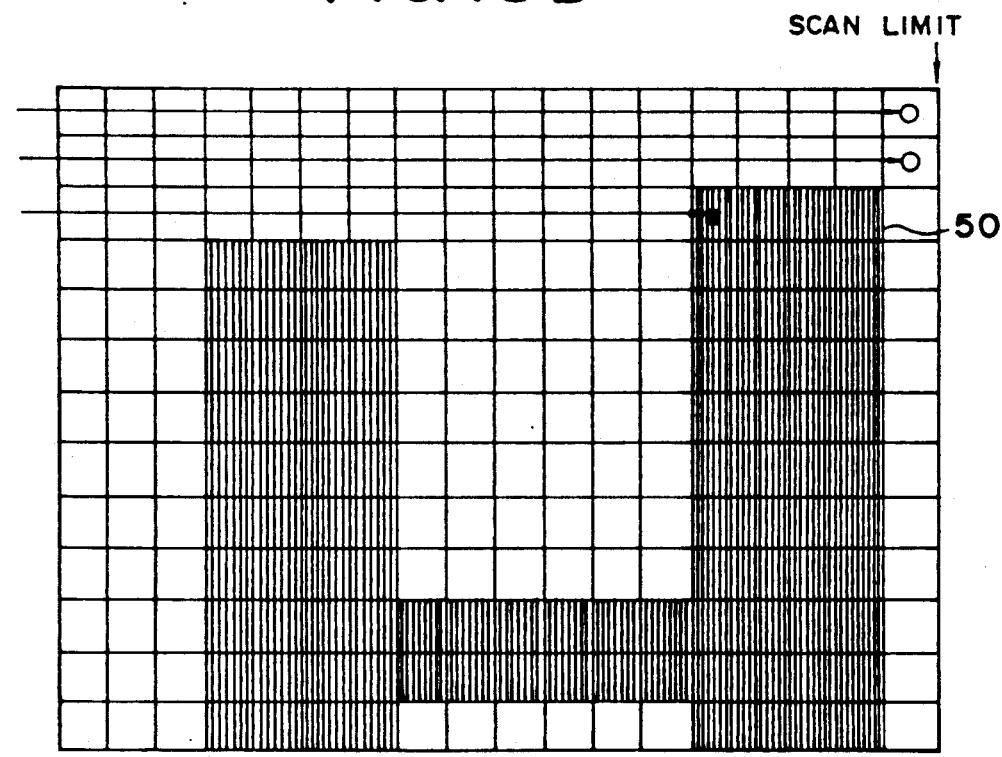

FIG. 18A and 18B show an example in which the start point is detected by the conventional process. FIG. 18A is concerned with a case where there is no noise in a character image of "H", and FIG. 18B is concerned with a case where there exists noise in a character image of "H". In each of FIGS. 18A and 18B, "▼" denotes the first black pixel obtained by the raster-scan starting from the top of the rectangular region. In FIG. 18B, a reference numeral 50 indicates noise.

Figure 19A:
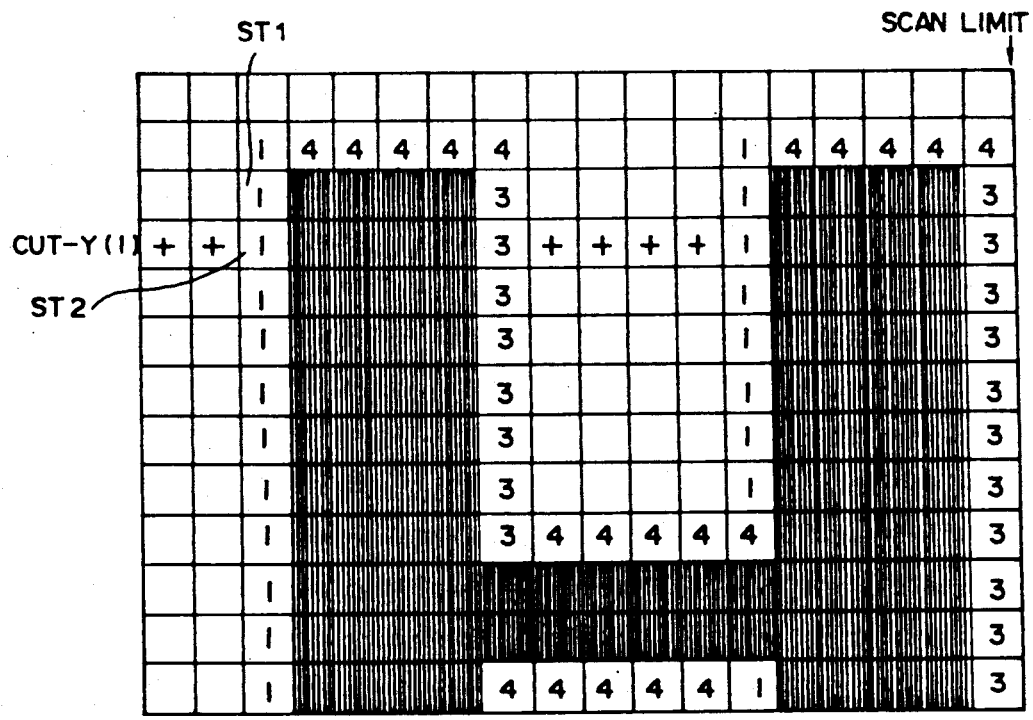
FIGS. 19A and 19B are views showing corrected start points obtained by the algorithm for correcting the start point.
Figure 19B:
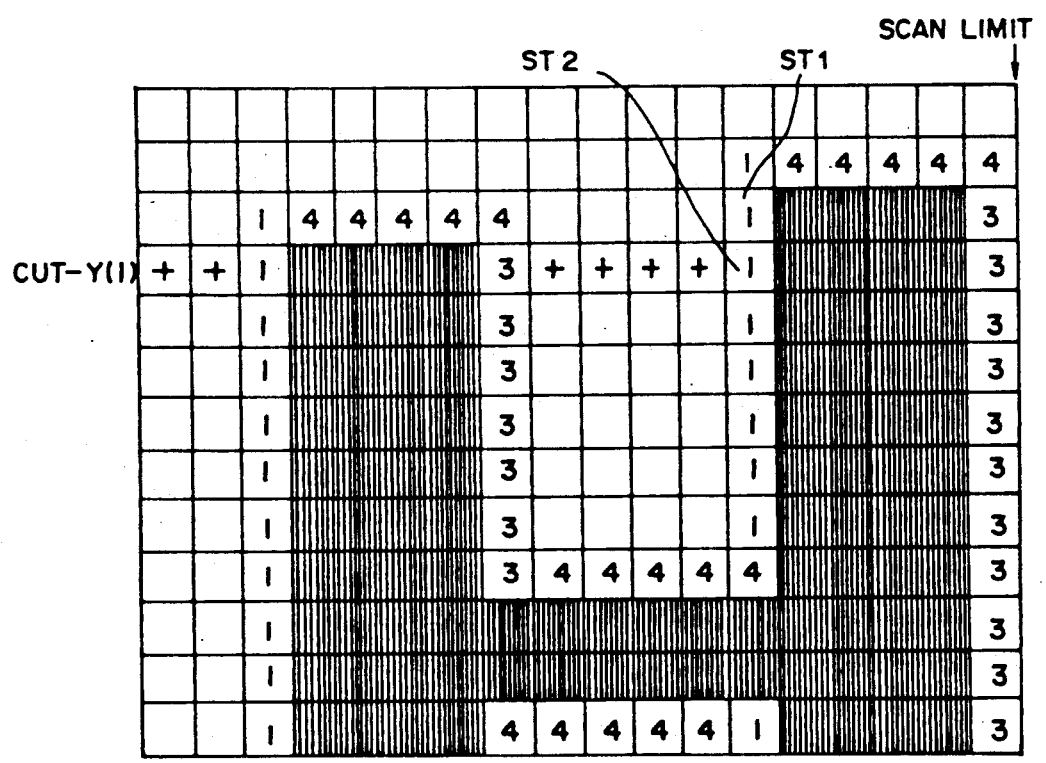

FIG. 19A shows a result obtained by subjecting the rectangular pattern of FIG. 18A to the processes composed of steps 1001 through 1003 described before, and FIG. 19B shows a result obtained by subjecting the rectangular pattern of FIG. 18B to the processes composed of steps 1001 through 1003. In each of FIGS. 19A and 19B, ST1 indicates the original start point by step 1003, and ST2 indicates the start point obtained after the correction defined by step 1003. It is seen from FIGS. 18A, 18B, 19A and 19B that in the case where the character image has noise 50, it is impossible to obtain the correct start point even when the original start point obtained by the raster-scan is subjected to the process defined by step 1003 described above.

Figure 20A:
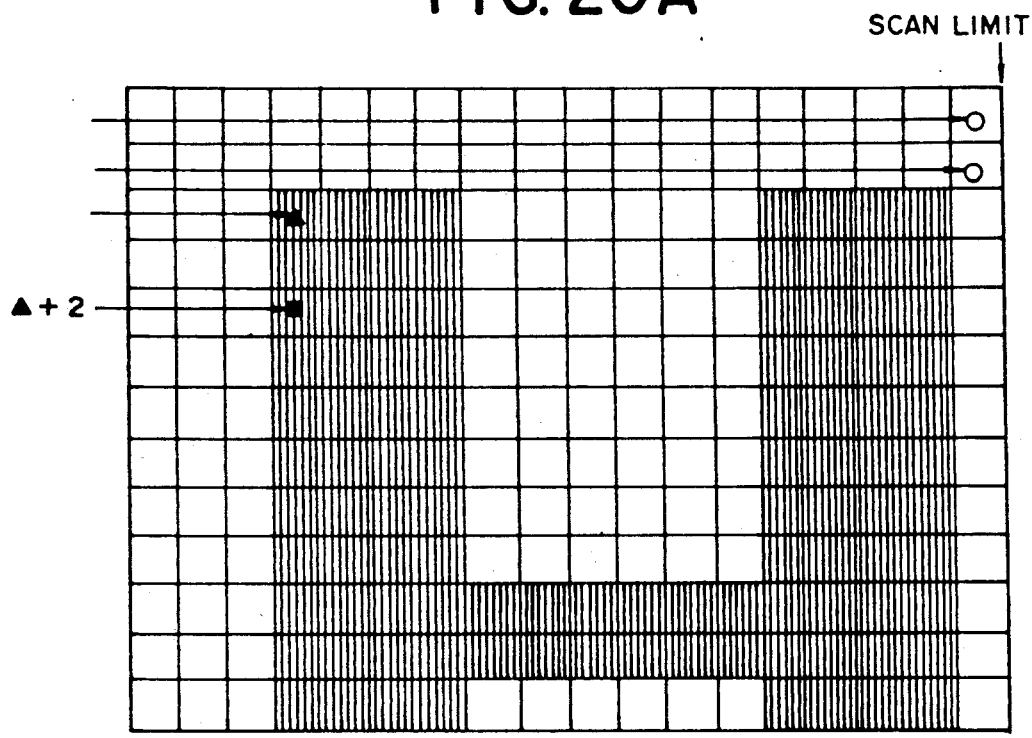
FIGS. 20A and 20B are views for algorithm of a third embodiment of correcting the start point.
Figure 20B:
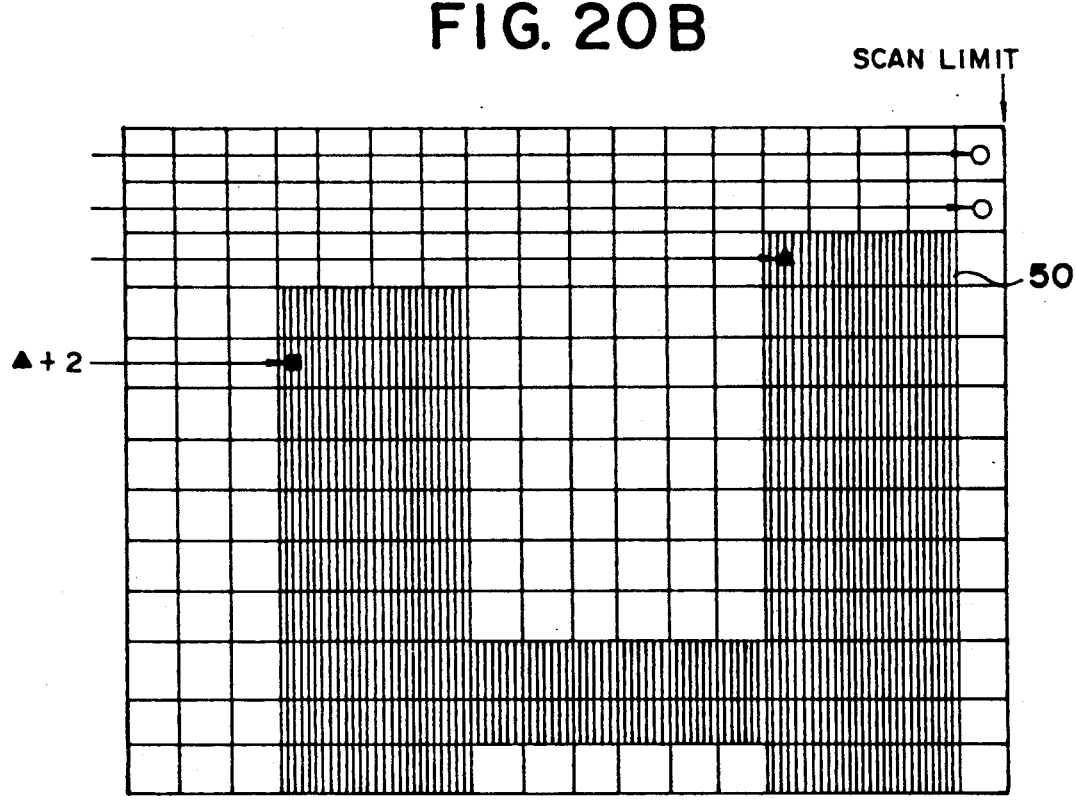

In order to avoid the above problem, as shown in FIGS. 20A and 20B, the raster-scan is carried out two times. In the first raster-scan starting from the top of the rectangular region, the first change from a white pixel to a black pixel is detected. "▲" indicates this black pixel. Then the second raster-scan is carried out, starting from the line positioned two lines below the line having the symbol "▲+2". In the second raster-scan, the first change from a white pixel to a black pixel is detected. "▼" indicates this black pixel.

Figure 21A:
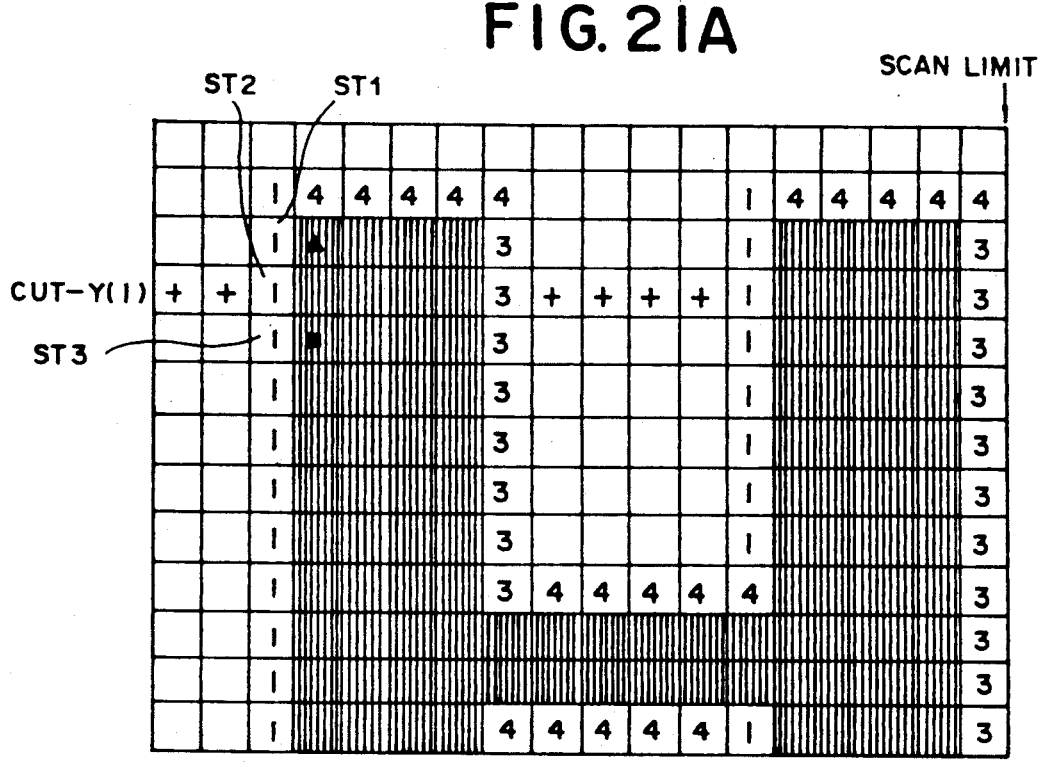
FIGS. 21A and 21B are views for explaining start points obtained by the algorithm of the third embodiment for correcting the start point.
Figure 21B:
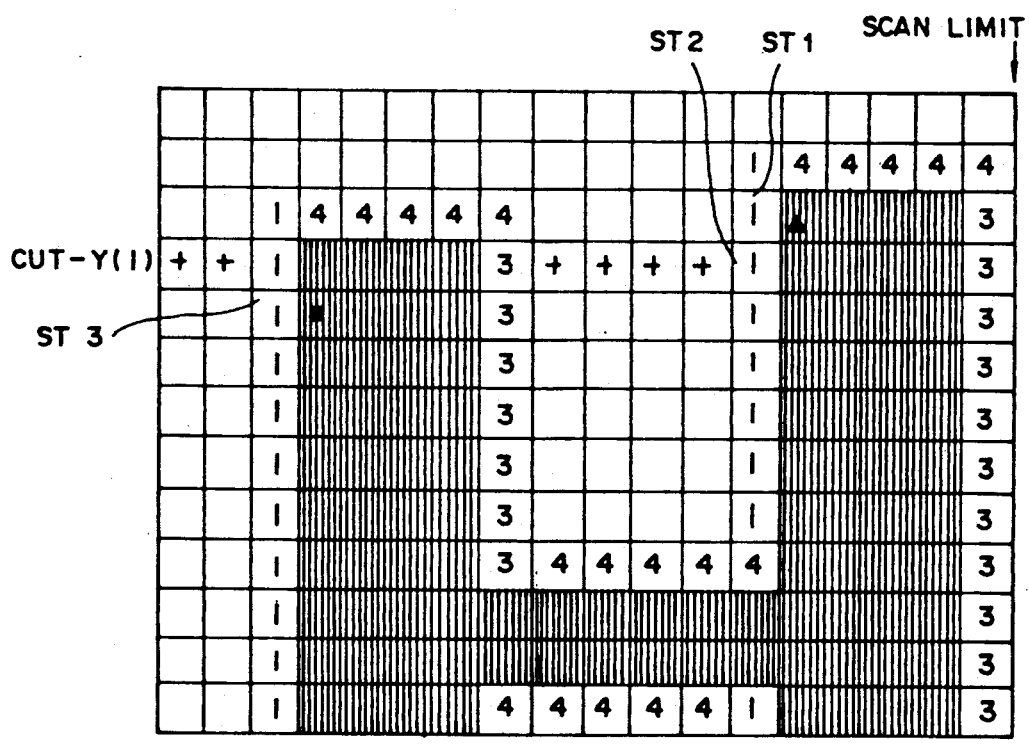

FIG. 21A shows a new start point ST3 decided by the second raster-scan for the case of FIG. 20A, together with the start point ST1 and the corrected start point ST2. FIG. 21B shows a new start point ST3 for the case of FIG. 20B, along with the start point ST1 and the corrected start point ST2. It can be seen from comparison between FIGS. 21A and 21B that the new start points ST3 are positioned at the same position in the rectangular region. This means that the embodiment 3 is not affected by the presence of noise in the character image.

The embodiments 1 through 3 of step 1003 refer to the group of the feature quantities of the contour portion which is represented by the directional codes. However, the embodiments are applicable to codes other than the direction codes.

STEPS 1004 and 1005 (FIG. 2)

At step 1004, the CPU 20 subjects direction codes of segments of the character image defined by the region dividing lines CUT-Y1 and CUT-Y2 to a predetermined operation for obtaining feature quantities of shapes of the segments. Then at step 1005, the CPU 20 generates the feature quantities of the character to be identified by using the obtained information. This process is carried out in accordance with the topological feature quantity extracting program 35 or the histogram generating program 36 stored in the ROM 30.

A description is first given of the process of extracting the topological feature of the character.

EMBODIMENT 1 OF STEPS 1004 AND 1005 OF FIG. 2

Embodiment 1 refers to the sequence of the direction codes stored in the direction code storing region 43 provided in the ROM 40. In this case, the start point of this sequence is the start point obtained by the embodiment 1 of step 1003 described previously. In the embodiment 1, the sequence of the direction codes is sequentially traced and a value of the y coordinate of each of the traced direction codes is generated. Then, the embodiment 1 checks a positional relationship between the y coordinate of the direction codes and the region dividing lines CUT-Y1 and CUT-Y2. Then, the topological feature quantities of the character are extracted on the basis of the obtained positional relationship. The extracted feature quantities are stored in the region 47 provided in the RAM 40.

Figure 23:
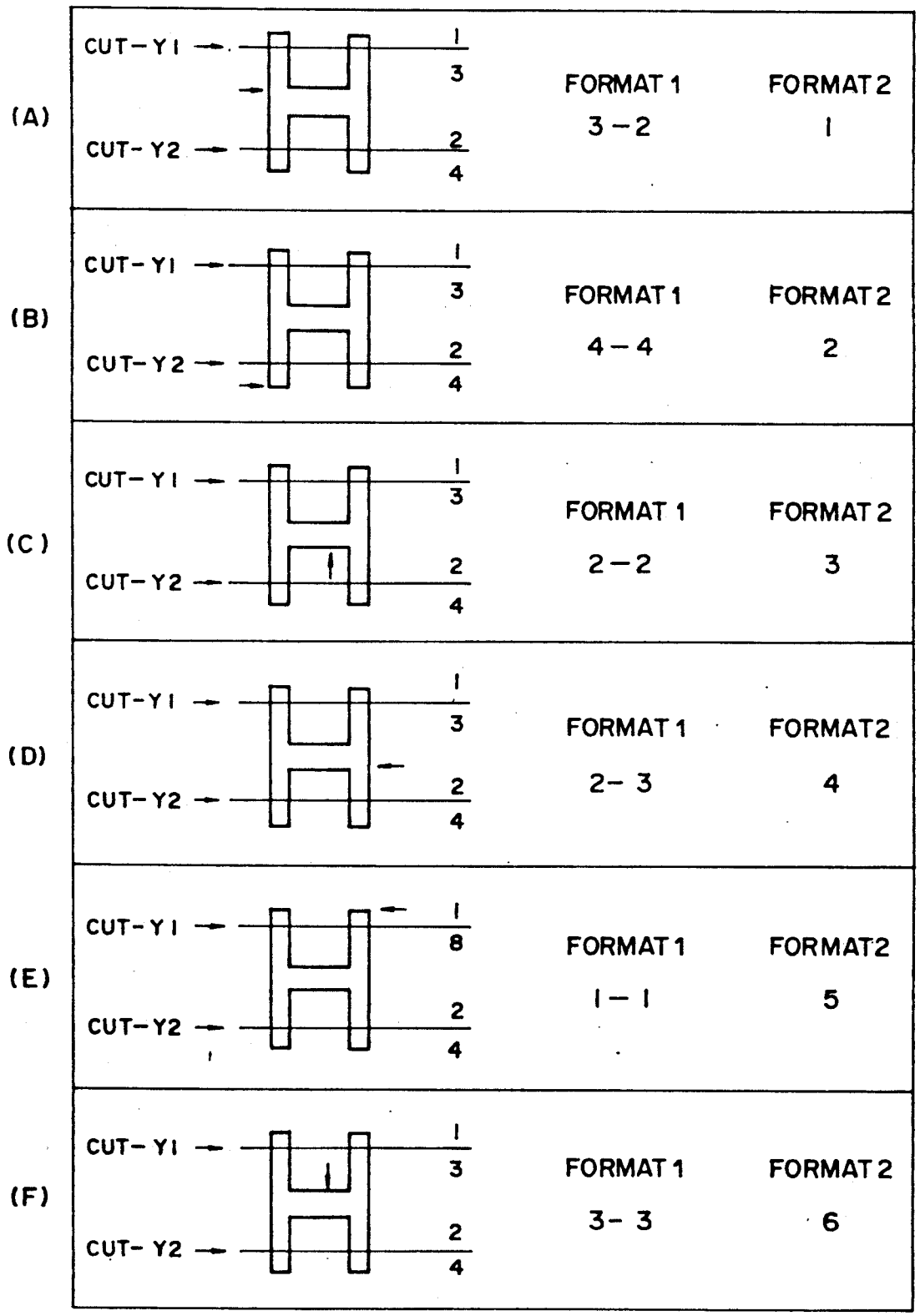
FIG. 23 is a view for explaining topological feature quantities of a character.

FIG. 23 is a view of showing a correspondence between the region dividing lines CUT-Y1 and CUT-Y2 and the topological feature quantities of the character. In FIG. 23, a character "H" is shown and the character image thereof is traced in the counterclockwise direction. The region dividing lines CUT-Y1 and CUT-Y2 are obtained with respect to the character image as shown in FIG. 23. Numerals 1 and 3 are associated with the region dividing line CUT-Y1, and numerals 2 and 4 are associated with the region dividing line CUT-Y2. The topological feature quantities have six types as shown in FIG. 23(A) through 23(F). The types of the topological feature quantities can be represented by either description format [1] or description format [2].

FIG. 23(A) shows a feature quantity which indicates that the character contains a segment extending downwardly from the region dividing line CUT-Y1 to the region dividing line CUT-Y2. The feature quantity of FIG. 23(A) is represented as (3-2) by the description format [1] and as (1) by the description format [2].

FIG. 23(B) shows a feature quantity which indicates that the character contains a segment which extends downwardly from the region dividing line CUT-Y2 and returns to the region dividing line CUT-Y2. The feature quantity of FIG. 23(B) is represented by (4-4) and (2) in the description formats [1] and [2], respectively.

FIG. 23(C) shows a feature quantity which indicates that the character contains a segment which extends upwardly from the region dividing line CUT-Y2 and returns to the region dividing line CUT-Y2. The feature quantity of FIG. 23(C) is represented as (2-2) and (3) in the description formats [1] and [2], respectively.

FIG. 23(D) shows a feature quantity which indicates that the character contains a segment which extends upwardly from the region dividing line CUT-Y2 to the region dividing line CUT-Y1. The feature quantity of FIG. 23(D) is represented as (2-3) and (4) by the description formats [1] and [2], respectively.

FIG. 23(E) shows a feature quantity which indicates that the character contains a segment which extends upwardly from the region dividing line CUT-Y1 and returns to the region dividing line CUT-Y1. The feature quantity of FIG. 23(E) is represented as (1-1) and (5) by the description format [1] and [2], respectively.

FIG. 23(F) shows a feature quantity which extends downwardly from the region dividing line CUT-Y1 and returns to the region dividing line CUT-Y1. The feature quantity of FIG. 23(F) is represented by (3-3) and (6) by the description formats [1] and [2], respectively.

FIG. 22 shows a character image which is the same as that shown in FIG. 7. In the illustrated example, the topological feature quantities thereof are described as follows:

Description Format [1]

(3-2), (4-4), (2-3), (1-1)

Description Format [2]

(1), (2), (4), (5)

Figure 24:
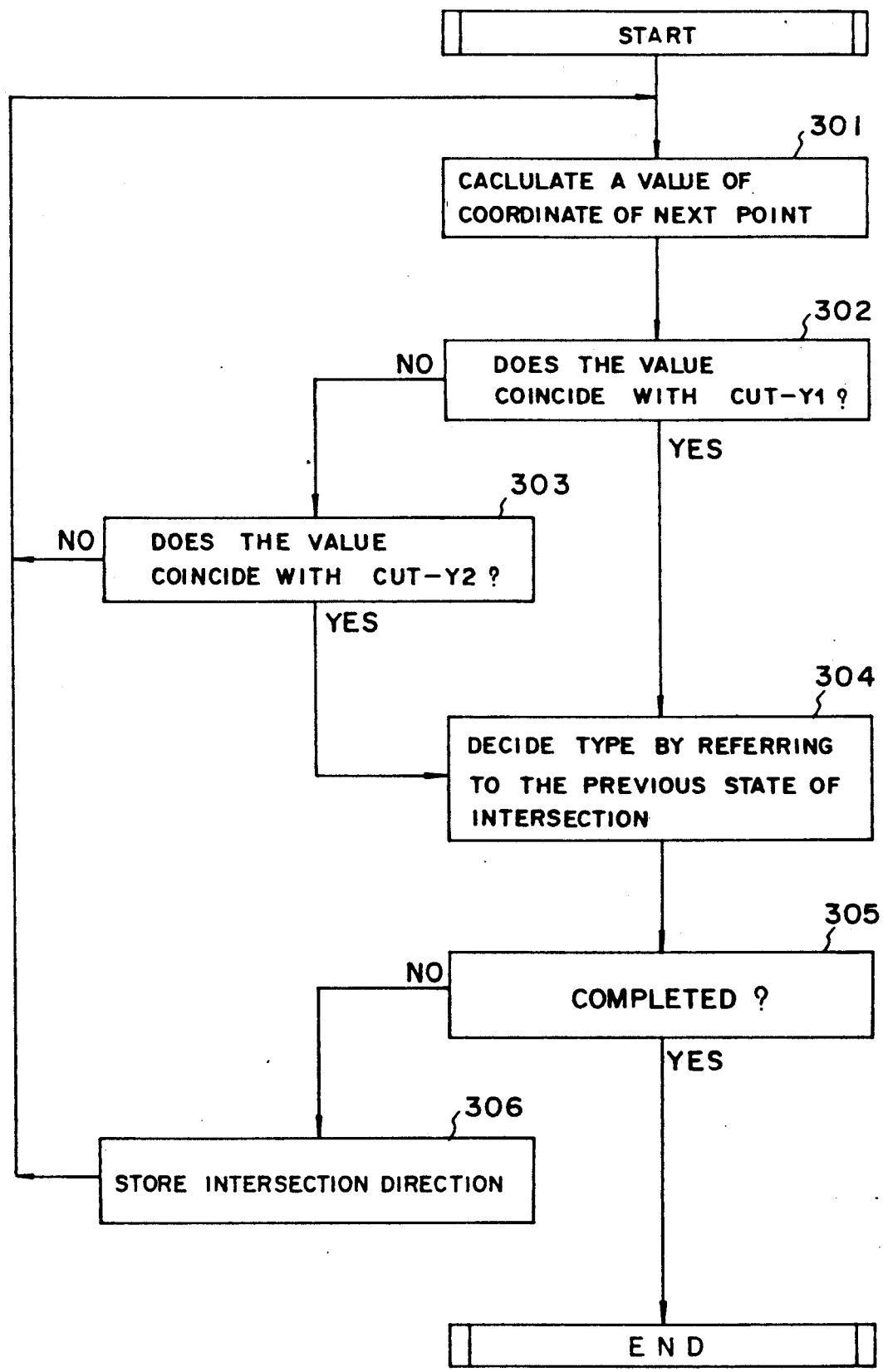
FIG. 24 is an overall flowchart of algorithm of extracting topological feature quantities.

FIG. 24 is an overall flowchart of algorithm for extracting the topological feature quantities of the character of the embodiment 1. At step 301 of FIG. 24, a value of the y coordinate following the y coordinate of the direction code being processed is calculated. Then at step 301, it is checked whether or not the value of the y coordinate obtained at step 301 coincides with the value of the y coordinate of the region dividing line CUT-Y1 on the upper side. When both the values of the y coordinate are not equal to each other, at step 303, it is subsequently checked whether or not the value of the y coordinate calculated at step 301 coincides with the value of the y coordinate of the region dividing line CUT-Y2 on the lower side. When both the values are different from each other, the process returns to step 301. When both the values are the same as each other, the process proceeds to step 304. When the result at step 302 is YES, the process also proceeds to step 304. At step 304, the type of the topological feature quantities of the segment being processed is decided by referring to a state in which the value previously processed of the y coordinate intersected the region dividing line. Thereafter, at step 305, it is checked whether or not all the y coordinates have been processed. When the result at step 305 is YES, the process ends. Alternatively when the result is NO, the process proceeds to step 306, at which information on a direction in which the tracing of the direction codes intersects the region dividing line is stored.

Figure 25A:
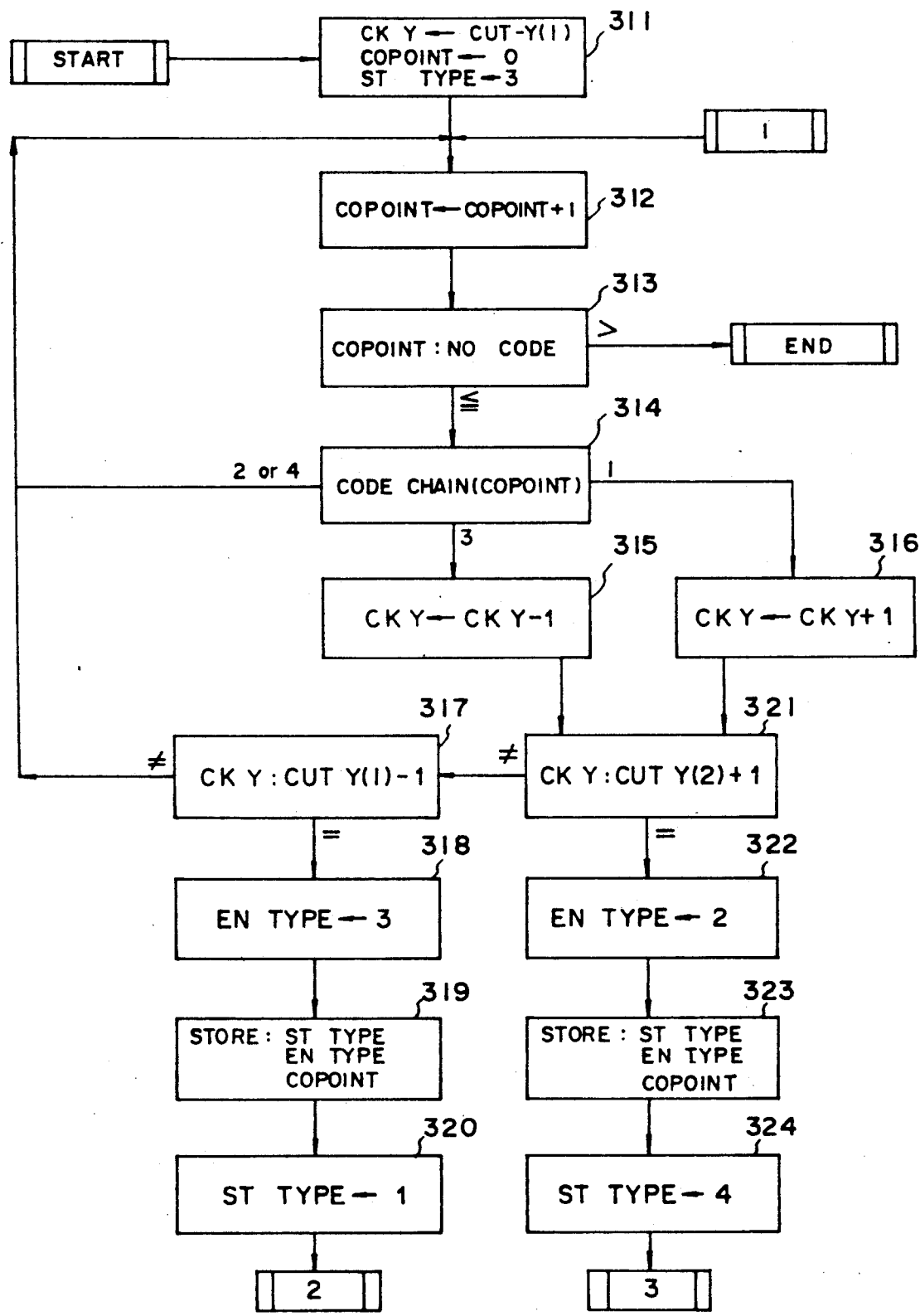
FIGS. 25A through 25C are flowcharts of algorithm of a first embodiment for finding a relationship between a start point for the contour tracing and region dividing lines and extracting topological feature quantities defined by steps 1004 and 1005, respectively.
Figure 25B:
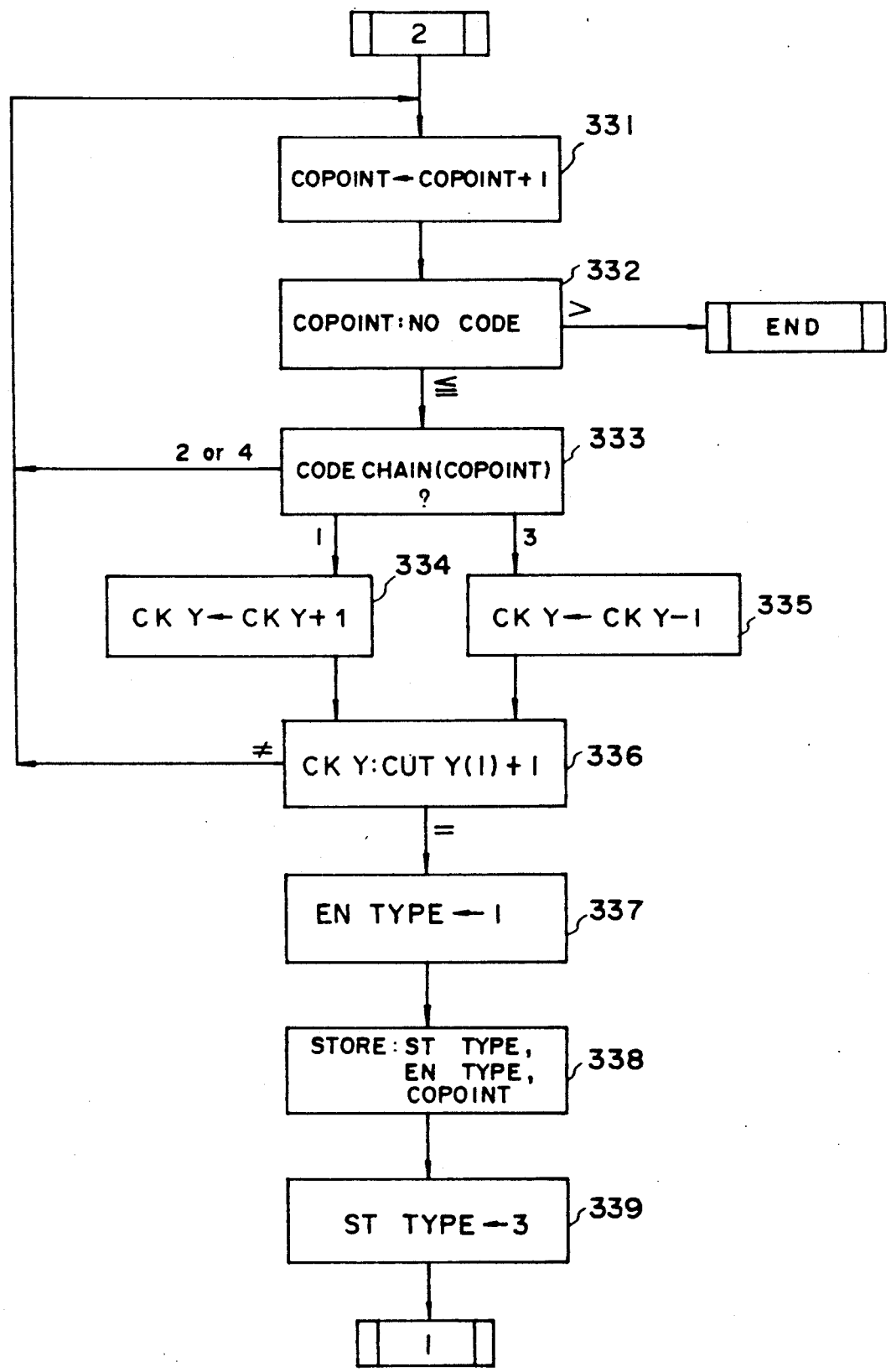
Figure 25C:
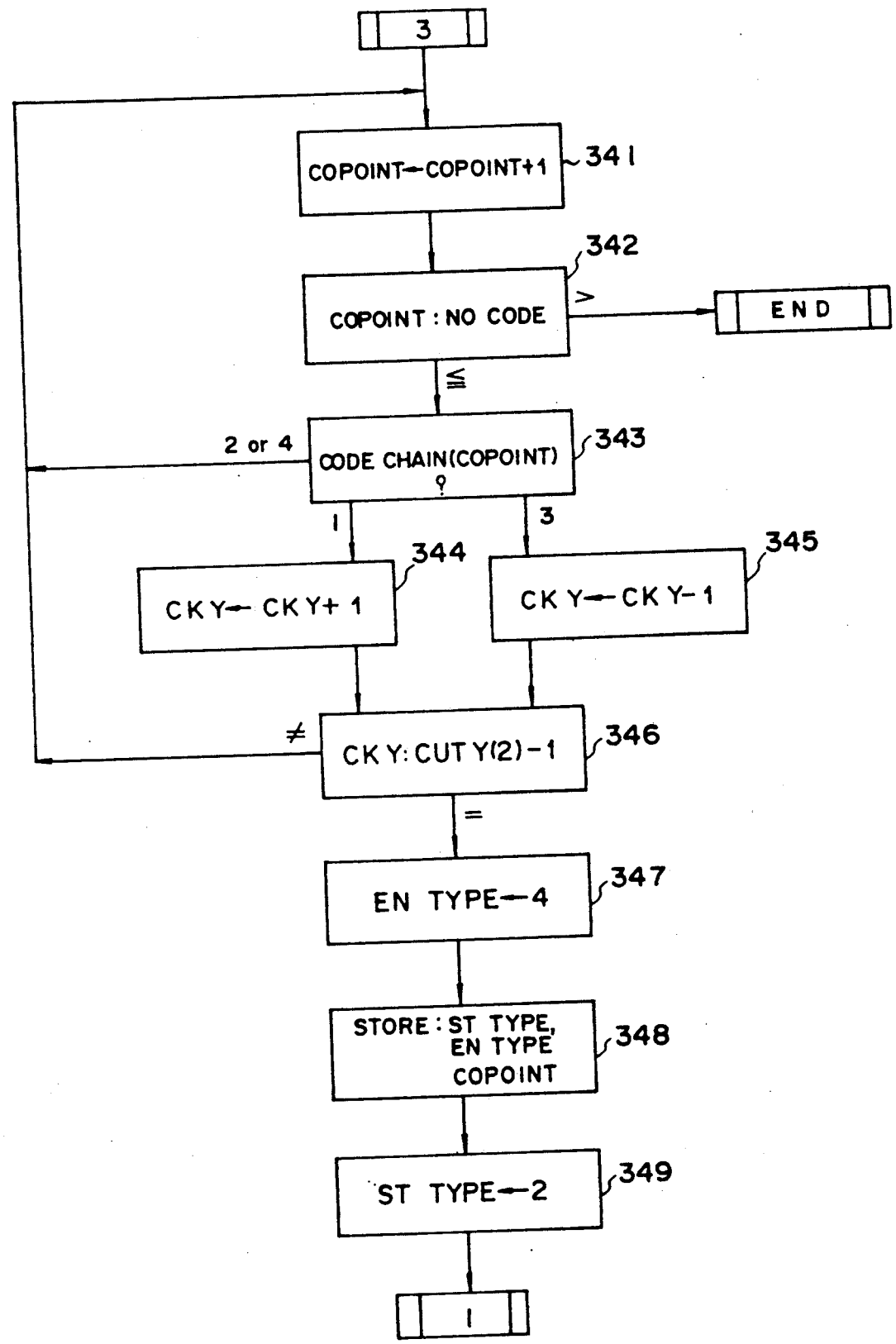

FIGS. 25A through 25C are detailed flowcharts of FIG. 24. The flowcharts of FIGS. 25A through 25C employ the description format [1]. The flowchart of FIG. 25A relates to a case in which the direction code being processed exists in a range between the region dividing lines CUT-Y1 and CUT-Y2. The flowchart of FIG. 25B relates to a case in which the direction code being processed exists in a range above the region dividing line CUT-Y1. The flowchart of FIG. 25C relates to a case in which the direction code being processed exists in a range below the region dividing line CUT-Y2. Most of symbols used in these flowcharts are the same as those used in the previous figures. Symbols ST TYPE and EN TYPE are employed in FIGS. 25A through 25C. The symbols ST TYPE and EN TYPE, which are paired, are used for describing the topological feature quantities based upon the description format [1]. For example, the topological feature quantity (1-1) is designated by ST TYPE=1 and EN TYPE=1, and the topological feature quantity (2-3) is designated by ST TYPE=2 and EN TYPE=3.

At step 311 of FIG. 25A, variation CK Y is set to the value of the y coordinate of the region dividing line CUT-Y1, the pointer COPOINT is set to a value of 0, and the start type ST TYPE is set to a value of 3. Then the pointer COPOINT is incremented by 1 at step 312, and the value of COPOINT is compared with the number of the direction codes stored in the direction code storing region 43 at step 313. When all the direction codes have been processed, the process ends. Alternatively when all the direction codes have not yet been processed, the process proceeds to step 314, at which it is checked which direction code is stored in the position indicated by the pointer COPOINT. When the direction code #2 or #4 is found, the process returns to step 312. When the direction code #1 is found, the process proceeds to step 316, and when the direction code #3 is found, the process proceeds to step 315.

At step 315, the value of the y coordinate is decremented by 1, and at step 316 the value of the y coordinate is incremented by 1. Then at step 321 the value of the y coordinate is compared with the value of the y coordinate of the line just below the region dividing line CUT-Y2. This step intends to find whether or not the tracing of the direction codes has just passed downwardly over the region dividing line CUT-Y2. When the tracing has passed downwardly over the region dividing line CUT-Y2, the process proceeds to step 322, and if not, the process proceeds to step 317. At step 317, it is checked that the value of the y coordinate is positioned on the line just above the region dividing line CUT-Y1. The step 317 intends to find whether or not the tracing of the direction codes has just passed upwardly over the region dividing line CUT-Y1. When this state is found the process proceeds to step 318, at which EN TYPE is set to a value of 3. Alternatively when the state is not found at step 317, the process returns to step 312. At step 319, the start type ST TYPE, the end type EN TYPE and the value of the pointer COPOINT are stored, ST TYPE is set to a value of 1 at step 320. Then the process proceeds to the sequence of FIG. 25B. At step 321, when it is found the tracing has passed downwardly over the region dividing line CUT-Y2, the end type is decided to be 2 at step 322, and a process identical to step 319 is carried out at step 323. Then the start type 4 is set and the process proceeds to the sequence of FIG. 25C.

Algorithm of FIG. 25B is concerned with the case in which the direction code being processed exists in the range above the region dividing line CUT-Y1, and steps 331 through 333 are the same as steps 312 through 314, respectively. Also steps 334 and 335 of FIG. 25B are the same as steps 316 and 315 of FIG. 25A, respectively. At step 336, the current value of the y coordinate is compared with the value of the y coordinate of the line just below the region dividing line CUT-Y1. This means that it is checked whether or not the tracing has passed downwardly over the region dividing line CUT-Y1. When both the values are not the same as each other, the process returns to step 331. Alternatively when both the values are the same as each other, namely, the tracing intersects downwardly the region dividing direction CUT-Y1, the end type EN TYPE is decided to be 1 at step 337. Then at step 338, the start type ST TYPE, the end type EN TYPE and the position indicated by the pointer COPOINT are stored. Subsequently, the start type ST TYPE = 3 is set at step 339.

Algorithm of FIG. 25C is concerned with the case in which the direction code being processed exists in the range below the region dividing line CUT-Y2, and steps 341 through 343 are the same as steps 312 through 314 of FIG. 25A, respectively. Also steps 344 and 345 of FIG. 25C are the same as steps 316 and 315 of FIG. 25A, respectively. At step 346, the current value of the y coordinate concerned with the direction code being processed is compared with the value of the y coordinate of the line positioned just above the region dividing line CUT-Y2. The step 346 means that it is checked whether or not the tracing of the direction codes has passed upwardly over the region dividing line CUT-Y2. When the result at step 346 is NO, the process returns to step 341. Alternatively when the result at step 346 is YES, the end type EN TYPE = 4 is decided. That is, the tracing intersects upwardly the region dividing line CUT-Y2. Then at step 348, the start type ST TYPE, the end type EN TYPE and the position in the direction code storing region 43 indicated by the pointer COPOINT are stored. Then at step 349, the start type ST TYPE = 2 is set and the process proceeds to the sequence of FIG. 25A.

EMBODIMENT 2 OF STEPS 1004 AND 1005 OF FIG. 2

Embodiment 2 uses the start point obtained by the algorithm defined by the embodiment 2 of step 1003. In this regard, the embodiment 2 of steps 1004 and 1005 is different from the embodiment 1 thereof.

Figure 26A:
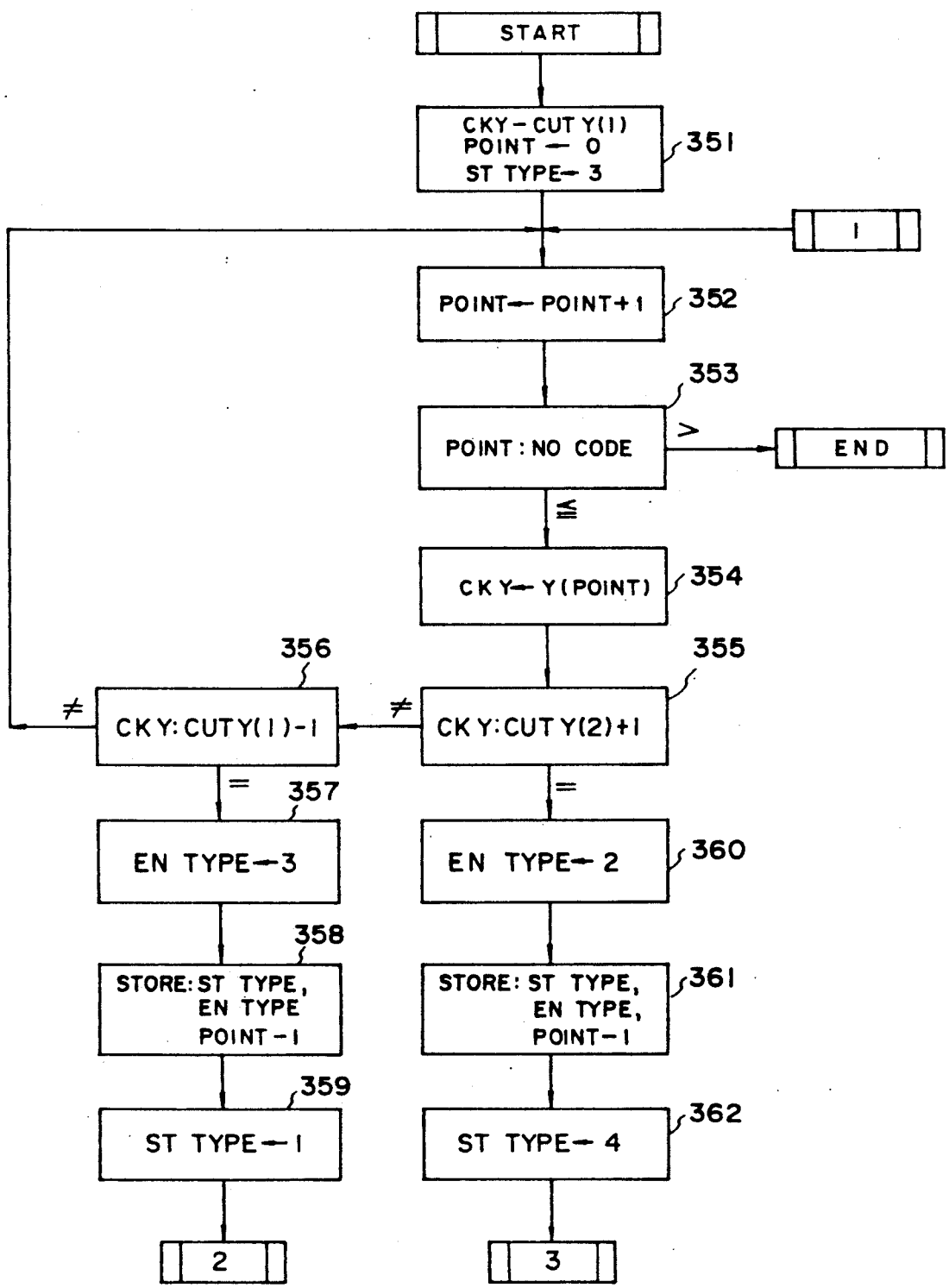
Figure 26C:
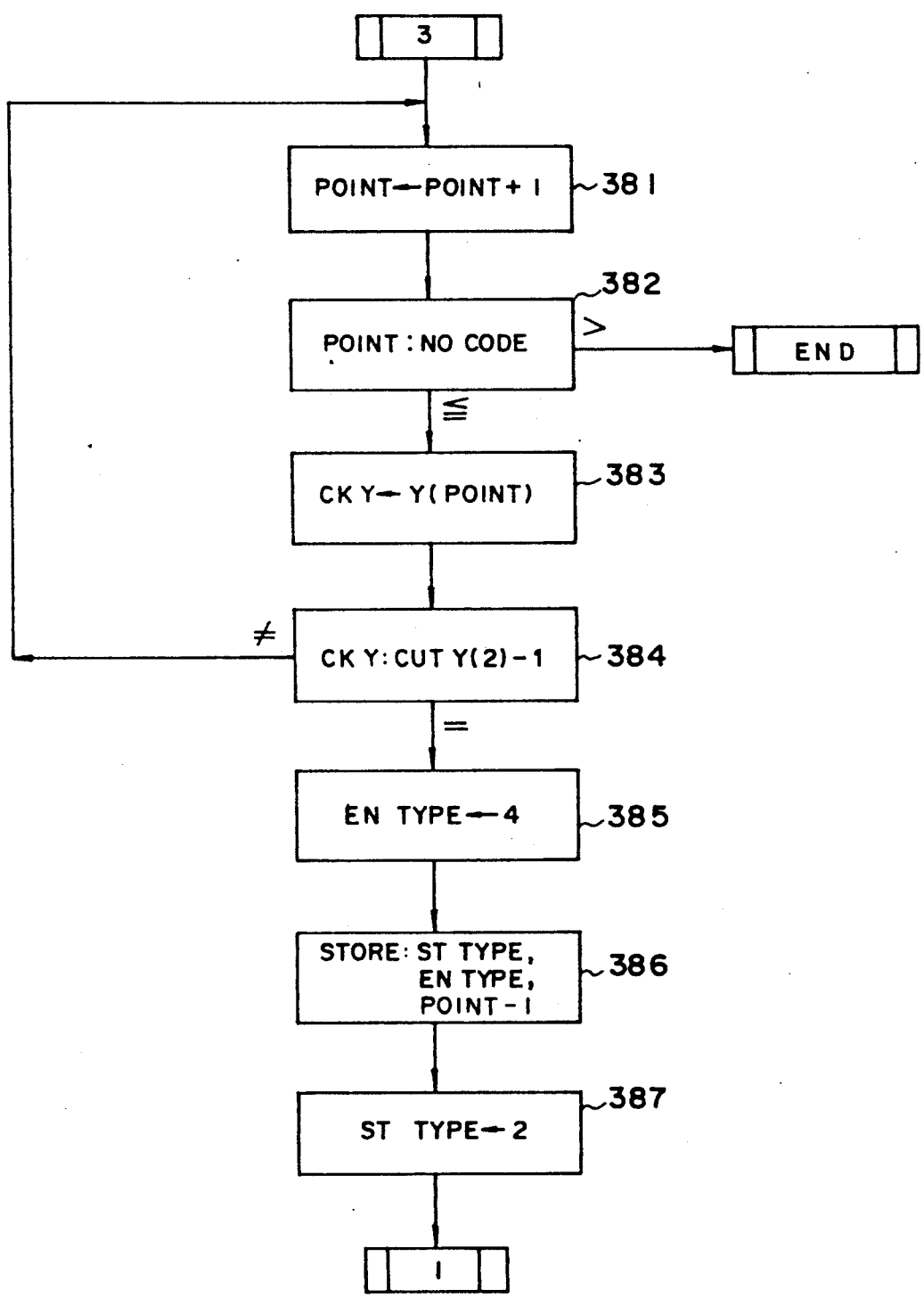

FIGS. 26A through 26C are flowcharts of the embodiment 2 and correspond to the flowcharts of FIGS. 25A through 25C, respectively. It is noted that in the algorithm of FIG. 25A, it is necessary to adjust the value of the y coordinate when the y coordinate having a value 1 or 3 is obtained, as defined at steps 314 through 316. On the other hand, the steps 314 through 316 of FIG. 25A correspond to step 354. The algorithm of FIG. 26A stores the y coordinate itself by using Y(-POINT), and it is therefore unnecessary to calculate the value of the y coordinate by detecting the direction codes #1 and #3. The other steps of FIG. 26A are the same as the corresponding steps of FIG. 25A.

The above holds true for the algorithm of FIGS. 26B and 26C. Step 373 of FIG. 26B corresponds to steps 333 through 335 of FIG. 25B, and step 383 of FIG. 26C corresponds to steps 343 through 345 of FIG. 25C. The other steps of FIGS. 26B and 26C are the same as the corresponding steps of FIGS. 25B and 25C, respectively.

EMBODIMENT 3 OF STEPS 1004 and 1005 OF FIG. 2

Embodiment 3 traces direction codes on the region dividing lines CUT-Y1 and CUT-Y2 and counts the number of the direction codes #1 and #3. The topological feature quantities of the character is represented by using the counted value.

Referring to FIG. 22, the direction code #1 at (4, 3) and the direction code #3 at (12, 3) are found by scanning the image data on the region dividing line CUT-Y1. Therefore a counted value of 2 is obtained regarding the region dividing line CUT-Y1. Similarly, the direction code #1 at (4, 20) and the direction code #3 at (13, 20) are found by scanning the image data on the region dividing line CUT-Y2. Therefore a counted value of 2 is obtained regarding the region dividing line CUT-Y2. The counted values thus obtained represent one feature quantity of the character. For example, the feature quantity of the character may be described as 2/2. The description of the topological feature quantities of the embodiment 3 is different from the descriptions of other embodiments. However, the feature represented by the embodiment 3 is similar to that represented by the other embodiments.

EMBODIMENT 4 OF STEPS 1004 and 1005 OF FIG. 2

Embodiment 3 corresponds to an improvement of the embodiment 1 shown in FIGS. 25A through 25C. The embodiment 3 scans the direction codes on the region dividing lines CUT-Y1 and CUT-Y2 and counts the number of the direction codes #2 and #4. The counted value is compared with a predetermined threshold value. When the counted value is smaller than the threshold value, a related segment of the character is deemed to be noise, and the feature quantity of the related segment is not adopted for describing the feature quantities of the character.

Figure 27A:
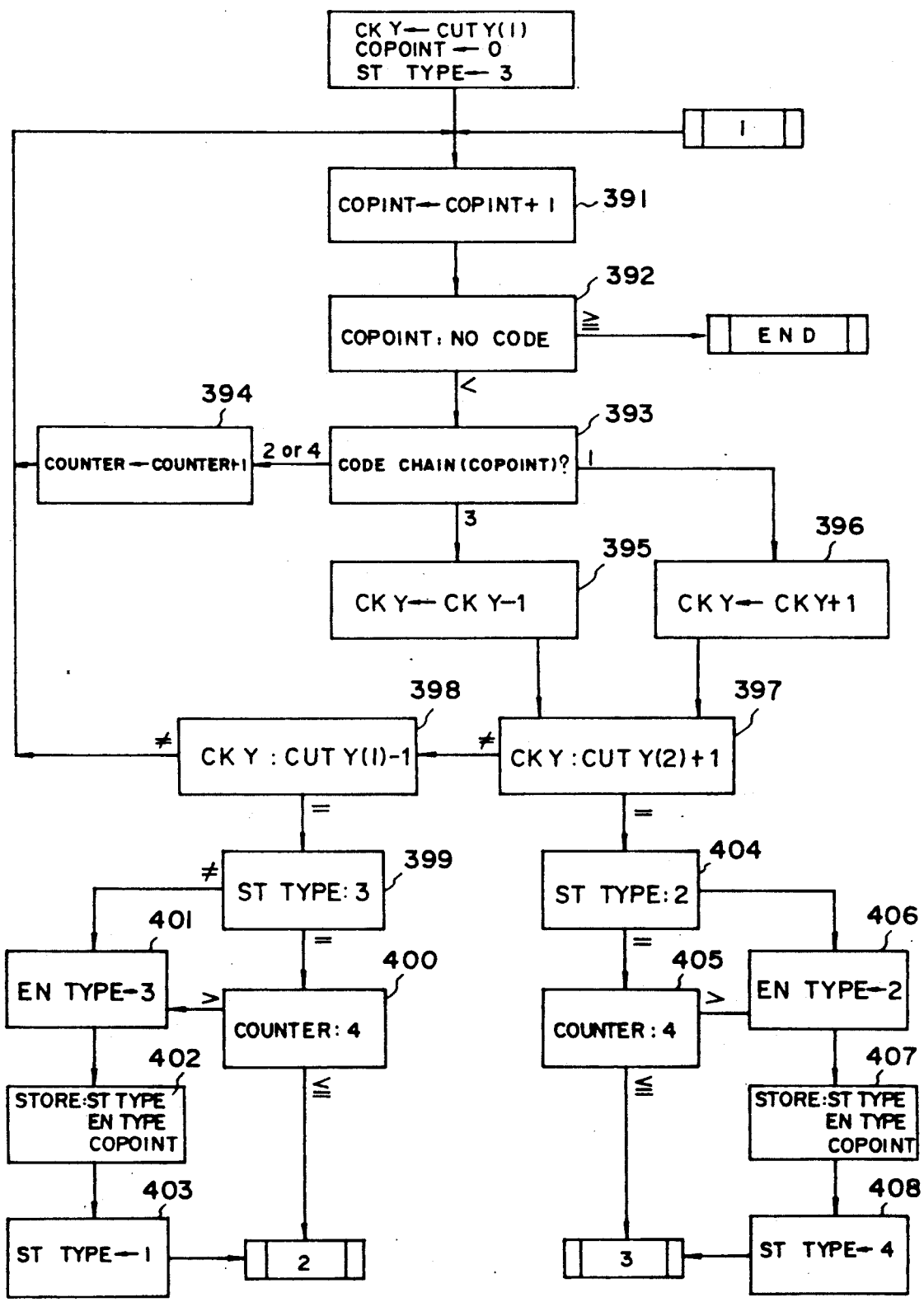
FIGS. 27A through 27C are flowcharts of algorithm of a fourth embodiment of steps 1004 and 1005 of FIG. 2.
Figure 27B:
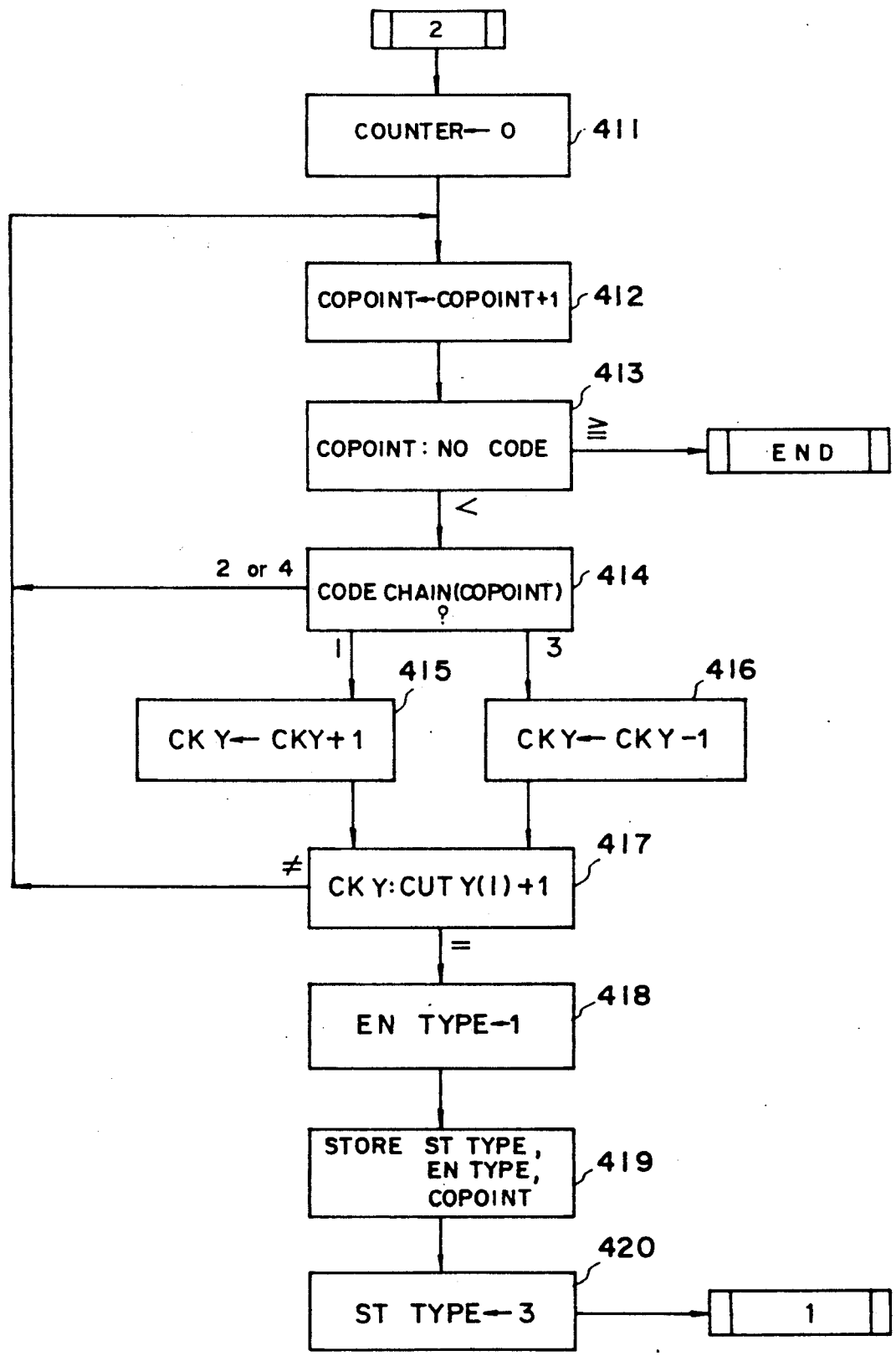
Figure 27C:
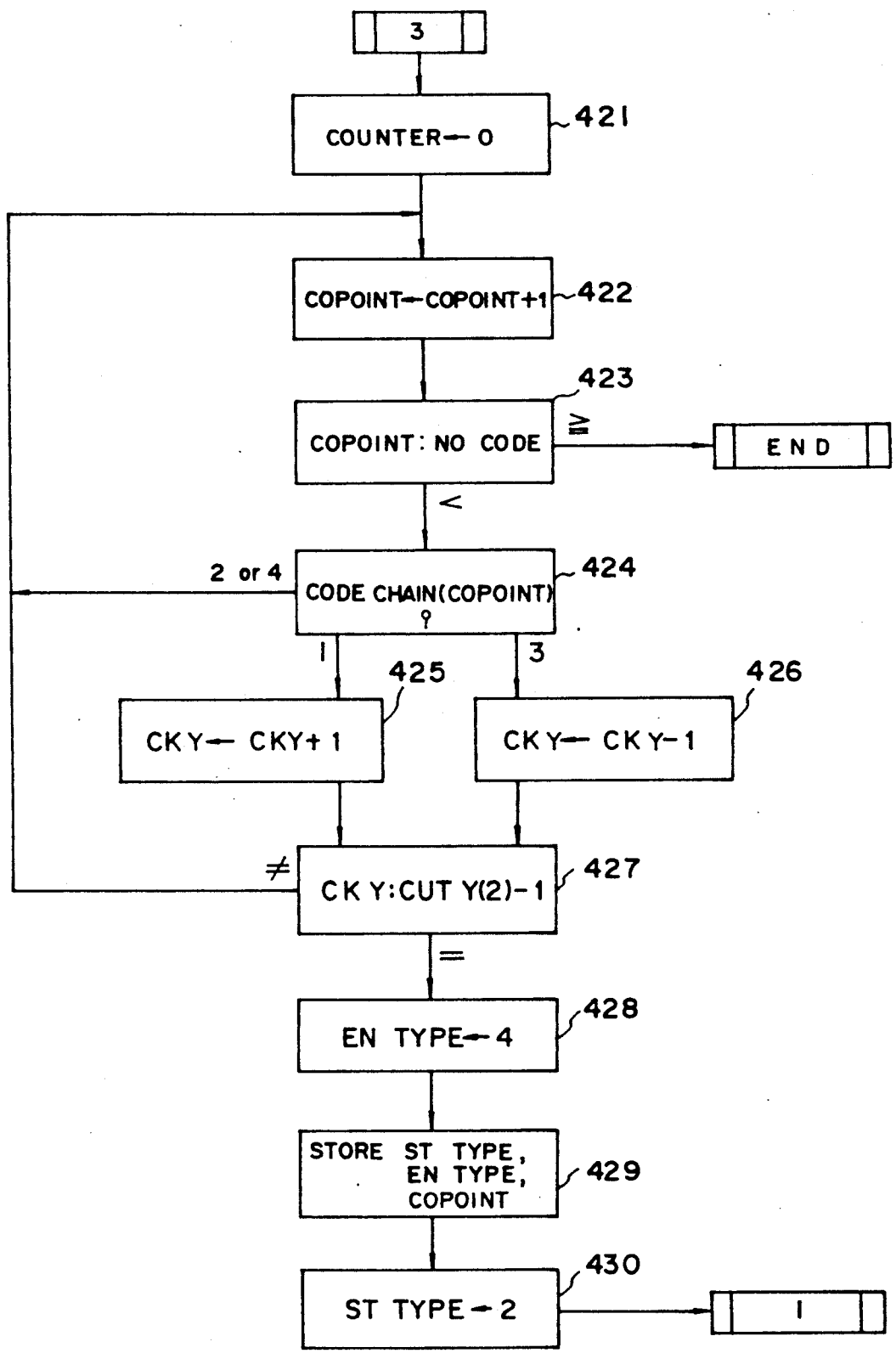

FIGS. 27A through 27C are flowcharts of algorithm of the embodiment 4 of steps 1004 and 1005. FIGS. 27A through 27C are related to FIGS. 25A through 25C, respectively.

Figure 28A:
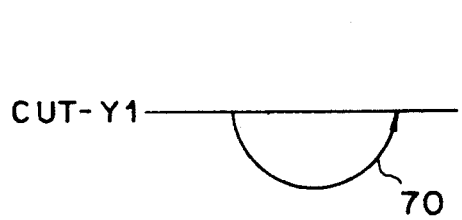
FIGS. 28A and 28B are views for explaining algorithm of a fifth embodiment of steps 1004 and 1005 of FIG. 2.

In FIG. 27A, steps 394, 399, 400, 404 and 405 are steps which are added to the flowchart of FIG. 25A. The algorithm of FIG. 27A uses a counter COUNTER for counting the number of the direction codes #2 and #4 indicating the horizontal shift directions. At step 394, when the direction code of the position in the direction code storing region 43 indicated by the pointer POINT is #2 or #4, the counter COUNT is incremented by 1. At step 398, when it is found that the tracing point has passed upwardly over the region dividing line CUT-Y1, the process proceeds to step 399, at which it is checked whether or not the current start type ST TYPE is 3. When ST TYPE=3, this means that the tracing point passes downwardly over the region dividing line CUT-Y1 and passes upwardly over the region dividing line CUT-Y1. That is, the character being processed contains a segment 70 as shown in FIG. 28A. In this case, the counted value in the counter COUNT is checked at step 400. In the present embodiment 4, a threshold value equal to 4 is predetermined. That is, the counted value is compared with a value of 4. When the counted value exceeds 4, the process proceeds to step 401 which corresponds to step 318 shown in FIG. 25A. When the counted value is equal to or smaller than 4, the process proceeds to step 411 of FIG. 27B. Hence, the feature quantity of the segment 70 is not adopted to describe the feature quantities of the character to be identified.

Figure 28B:

At step 397, when it is found that the tracing point has passed downwardly over the lower region dividing line CUT-Y2, the process proceeds to step 404. At step 404, the current start type ST TYPE is equal to 2. When ST TYPE=2, this means that the tracing point passes upwardly over the lower region dividing line CUT-Y2 and then passes downwardly over the same line. That is, the character contains a segment 71 as shown in FIG. 28B. Then the process proceeds to step 405, at which it is checked whether or not the counted value is smaller than the threshold value 4. When the counted value is equal to or larger than 4, step 406 identical to step 322 of FIG. 25A is carried out. Alternatively when the counted value is smaller than 4, the process proceeds to step 421 of FIG. 27C. Therefore the feature quantity of the segment 71 is not adopted.

The flowchart of FIG. 27B is the same as the flowchart of FIG. 25B except for the presence of step 411 provided in the flowchart of FIG. 27B. At step 411, the counter COUNTER is reset.

The flowchart of FIG. 27C is the same as the flowchart of FIG. 25C except for the presence of step 421 provided in FIG. 27C. At step 421, the counter COUNTER is reset.

EMBODIMENT 5 OF STEPS 1004 AND 1005 OF FIG. 2

Embodiment 5 counts the number of all the direction codes related to a segment. When the total number of the direction codes is smaller than a predetermined threshold value, the segment is deemed to be noise. In this case, the counting operation of the total number is carried out for only the segments 70 and 71 shown in FIG. 28A and 28B. When the segment 70 or 71 has direction codes having a total value smaller than the threshold value, the segment is decided to be noise.

In the embodiments 1 through 5, the direction codes #1 through #4 are used. However the algorithm of each of the embodiments 1 through 5 is applicable to codes other than the direction codes.

The embodiments 1 through 5 describe the feature of the characters by the topological feature quantities. The following embodiments 6 through 9 uses histograms of the direction codes #1 to #4.

EMBODIMENT 6 OF STEPS 1004 and 1005

Figure 29:
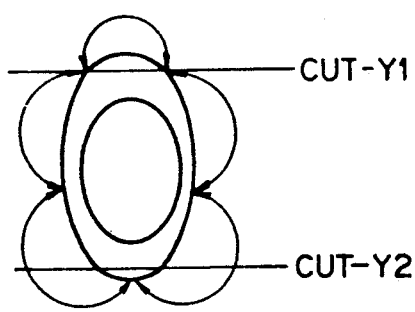
FIG. 29 is a view for explaining algorithm of a sixth embodiment of steps 1004 and 1005 of FIG. 2.

Embodiment 6 equally divides the contour image into n segments by using one of the region dividing lines as a start point for division, and generates a histogram of the direction codes for each of the n segments of the contour image. An example of the embodiment 6 is shown in FIG. 29. An illustrated contour image is equally divided into 5 segments with respect to the upper region dividing line CUT-Y1. Then the histogram of the direction codes #1 through #4 for each of the divided segments is generated.

EMBODIMENT 7 OF STEPS 1004 and 1005

Figure 30:
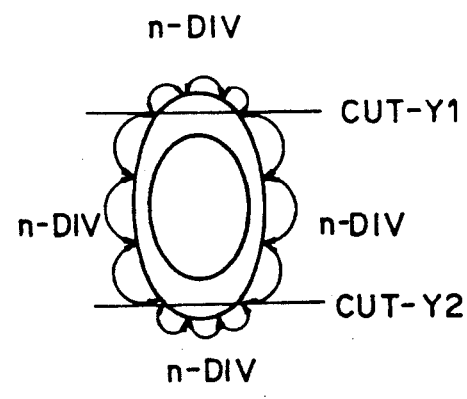
FIG. 30 is a view for explaining algorithm of a seventh embodiment of steps 1004 and 1005 of FIG. 2.

Embodiment 7 divides the contour image into segments by the region dividing lines CUT-Y1 and CUT-Y2. Then each of the obtained segments is equally divided into n parts. Thereafter, histogram for each of the divided parts is generated. An example of the embodiment 7 is shown in FIG. 30.

EMBODIMENT 8 OF STEPS 1004 AND 1005 OF FIG. 2

Figure 31:
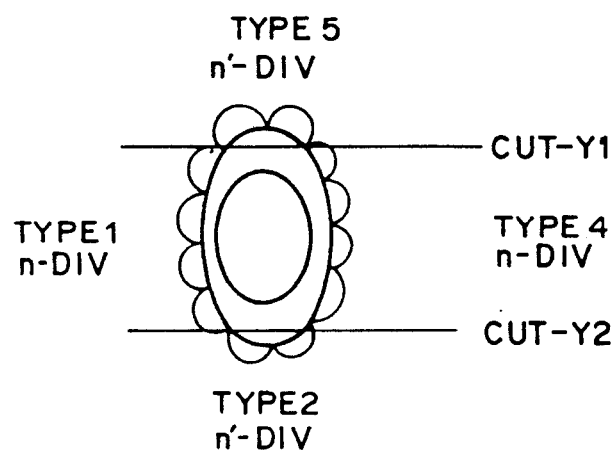
FIG. 31 is a view for explaining algorithm of an eighth embodiment of steps 1004 and 1005 of FIG. 2.

Embodiment 8 divides the contour image into segments by the region dividing lines CUT-Y1 and CUT-Y2. Then, each of the segments id equally divided into parts. In this case, the number of division for each of the segments depends on the topological feature quantities. An example of the embodiment 8 is illustrated in FIG. 31. Type 1 and 4 of the topological feature quantities in the description format [2] described before indicate segments in which stroke of the character is relatively stable. On the other hand, type 2 and 5 indicate segments in which stroke is relatively sensitive to noise and the like and is therefore unstable. Therefore the stable segments are divided into more parts than the unstable segments. That is, the stable segments are divided into n parts and the unstable segments are divided into n' parts (n' < n). The embodiment has a function of absorbing any errors which may be introduced in histogram.

EMBODIMENT 9 OF STEPS 1004 AND 1005 OF FIG. 2

Figure 32:
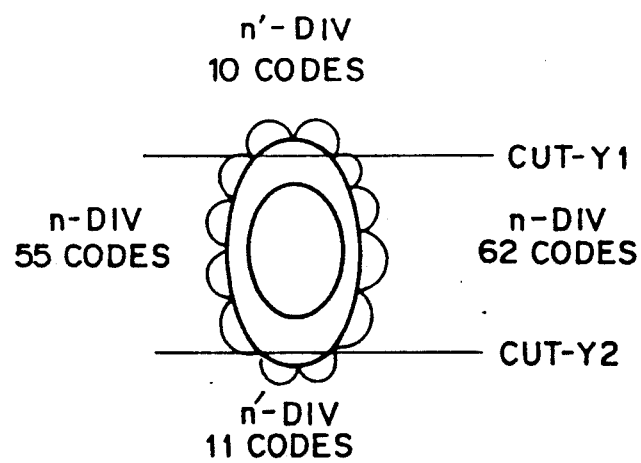
FIG. 32 is a view for explaining algorithm of a ninth embodiment of steps 1004 and 1005 of FIG. 2.

Embodiment 9 divides the contour image into segments by the region dividing lines CUT-Y1 and CUT-Y2. Each of the segments is equally divided into parts. In this case, the number of division for each of the segments depends on the number of direction codes included in the related segment. An example of the embodiment 9 is illustrated in FIG. 32. In FIG. 32, it is assumed that the segment above the upper region dividing line CUT-Y1 comprises 10 direction codes, the segments between the region dividing lines CUT-Y1 and CUT-Y2 comprise 55 and 62 direction codes, and the segment below the lower region dividing line CUT-Y2 comprises 11 direction codes. In the embodiment 9, it is assumed that when the number of the direction codes is equal to or larger than 15, the segment is equally divided into n parts, and that when the number of the direction codes is smaller than 15, the segment is equally divided into n' parts (n' < n). A segment having a number of the direction codes is relatively stable, and a segment not having many direction codes is sensitive to be affected by noise and is therefore unstable. For this reason, each segment is divided depending on the number of the direction codes included therein. This process also has a function of absorbing an error arising from the presence of noise.

A description is now given of further embodiments 10 through 14 of steps 1004 and 1005 of FIG. 2. The embodiments 10 through 14 may be combined with the embodiments 1 through 9. The embodiments 10 through 14 intend to enable speeding-up of the identification processing by extracting feature quantities which is hardly affected by the font style and size, and classifying a shape (category) of the character by referring to the extracted feature. It is preferable to perform the processes of the embodiments 10 through 14 before carrying out processes of the embodiments 1 through 9.

EMBODIMENT 10 OF STEPS 1004 and 1005

Figures 33A, 33B:
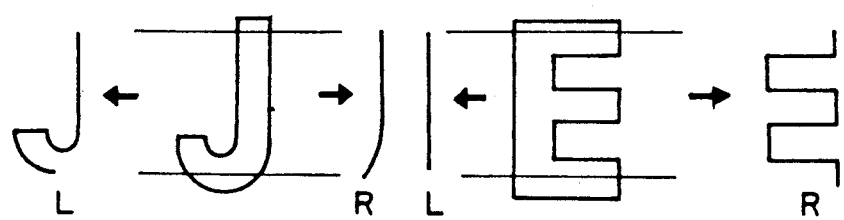
FIGS. 33A and 33B are views for explaining algorithm of a tenth embodiment of steps 1004 and 1005 of FIG. 2.

Embodiment 10 is described by referring to FIGS. 33A and 33B. The embodiment 10 refers to a segment which extends from the upper region dividing line CUT-Y1 to the lower region dividing line CUT-Y2 (hereafter referred to as an L-segment) as well as a segment which extends from the lower region dividing line CUT-Y2 to the upper region dividing line CUT-Y1 (hereafter referred to as an R-segment). Then the number of the direction codes contained in each of the L and R-segments is counted by using the histogram stored in the histogram storing region 48 in the ROM 40. Then, it is found which segment is longer. The character being processed is then classified into one of predetermined categories. For example, with a character "J", the L-segment is longer than the R-segment as shown in FIG. 33A. With a character "E", the R-segment is longer than the L-segment as shown in FIG. 33B. Therefore, characters "J" and "E" can be discriminated so as to belong to different categories.

EMBODIMENT 11 OF STEPS 1004 and 1005 OF FIG. 2

Embodiment 11 calculates a ratio between the number of direction codes of the L and R-segments, and a character being processed is classified into a category depending on a value of the obtained ratio. The ratio can be represented by two ways: one of which is a ratio (L/R) of the number of the direction codes of the L-segment to the number of the direction codes of the R-segment, and the other is a ratio (R/L) of the number of the direction codes of the R-segment to the number of the detection codes of the L-segment.

EMBODIMENT 12 OF STEPS 1004 AND 1005 OF FIG. 2

Figures 34A, 34B:
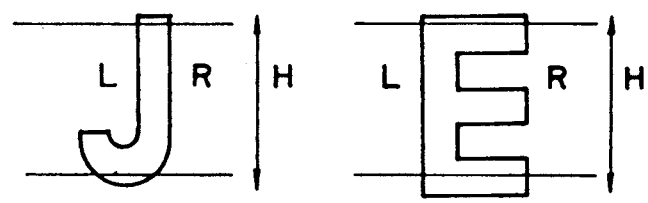
FIGS. 34A and 34B are views for explaining algorithm of an eleventh embodiment of steps 1004 and 1005 of FIG. 2.

Embodiment 12 is described by referring to FIGS. 34A and 34B. The embodiment 12 refers to segments between the upper and lower region dividing lines CUT-Y1 and CUT-Y2. Then a ratio of the number of the direction codes of the L-segment to a reference value is calculated. As a reference value, $1/n$ (n is an integer exceeding 1) of a height H of the character is selected, for example. For example, when $n=2$, the ratio $L/H/2$ is calculated. The character being processed is classified into a related category depending on a value of the ratio $L/H/2$. Likewise a ratio of the number of the direction codes of the R-segment to the reference value $H/n$ is calculated. When $n=2$ for example, the ratio $R/H/2$ is calculated. The character being processed is classified into a related category depending on a value of the ratio $R/H/2$.

EMBODIMENT 13 OF STEPS 1004 AND 1005 OF FIG. 2

Figure 35A:
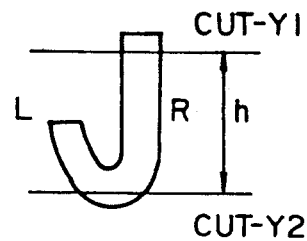
FIGS. 35A and 35B are views for explaining algorithm of a twelfth embodiment of steps 1004 and 1005 of FIG. 2.
Figure 35B:
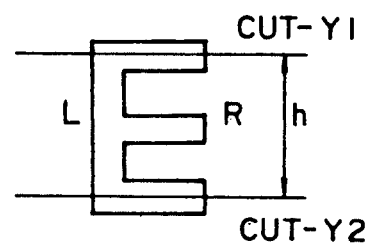

Embodiment 13 is described by referring to FIGS. 35A and 35B. The embodiment 13 refers to segments between the upper and lower region dividing lines CUT-Y1 and CUT-Y2. Then a ratio of the number of the direction codes included in the L-segment to a reference value is calculated. As a reference value of the embodiment 13, $1/n$ (n is an integer exceeding 1) of a distance h between the upper and lower region dividing lines CUT-Y1 and CUT-Y2 is selected, for example. For example, when $n=2$, the ratio $L/h/2$ is calculated. The character being processed is classified into a related category depending on a value of the ratio $L/h/2$. Likewise a ratio of the number of the direction codes of the R-segment to the reference value $h/n$ is calculated. When $n=2$ for example, the ratio $R/h/2$ is calculated. The character being processed is classified into a related category depending on a value of the ratio $R/h/2$.

EMBODIMENT 14 OF STEPS 1004 AND 1005 OF FIG. 2

Figure 36A:
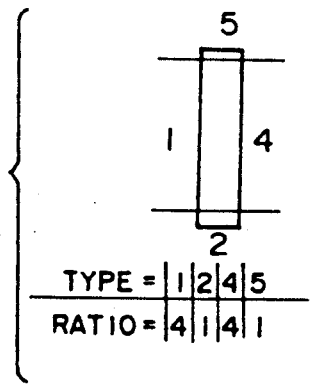
FIGS. 36A and 36B are views for explaining algorithm of a fourteenth embodiment of steps 1004 and 1005 of FIG. 2.
Figure 36B:
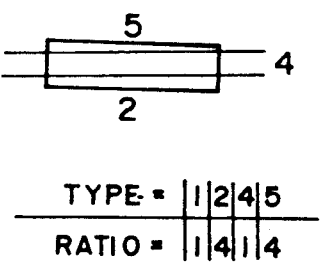

Embodiment 14 is described by referring to FIGS. 36A and 36B. The embodiment 14 refers to segments between the upper and lower region dividing lines CUT-Y1 and CUT-Y2. Then the number of the direction codes contained in each of the segments is calculated. Thereafter, a ratio of the number of the direction codes of each segment to the calculated number is calculated. This ratio obtained for each segment indicates a weight of the topological feature quantity of the segment with respect to all the topological feature quantities of the character being processed. For example, a character "I" shown in FIG. 36A has a number of the direction codes in the segments of the topological feature quantities (1) and (4). In the illustrated example, the topological feature quantity (1) occupies 40% of the whole. A symbol "—" shown in FIG. 36B has a number of the direction codes in the segments of the topological feature quantities (2) and (5). In the illustrated example, the topological feature quantity (1) occupies only 10% of the whole.

The present invention is not limited to the above embodiments but various variations and modification may be made without departing from the scope of the present invention. The above description directs attention mainly to the cases in which projections extracted in the horizontal direction are used. However, the present invention includes cases where projection extracted in the vertical direction are used.

What is claimed is:

1. A method of extracting feature quantities of a character including the steps of:
    optically scanning a character to be recognized to thereby generate a binary-valued character image;
    extracting feature information from a contour pattern of said binary-valued character image; and
    extracting feature quantities of said character from said feature information by using information on dividing lines for dividing said binary-valued character image into a plurality of portions, characterized by comprising:
    tracing said contour portion of said binary-valued character image to thereby generate feature information on said contour portion;
    setting a first region dividing line at a first position within the width of said contour portion viewed from an end of a circumscribed rectangular region to which said binary-valued character image is circumscribed;

setting a second region dividing line at a second position within the width of said contour portion viewed from an opposite end of said circumscribed rectangular region, said first and said second region dividing lines being used for extracting feature quantities of said character;

detecting intersection position where each of said first and second region dividing lines intersects said contour portion;

counting the number of said intersecting positions; and extracting feature quantities of said character from said feature information on said contour portion by using information on said intersecting positions, said feature quantities being represented by said counted number of said intersecting positions whereby said feature quantities are used to recognize said character.

2. The method of extracting feature quantities of a character including the steps of:

optically scanning a character to be recognized to thereby generate a binary-valued character image;

extracting feature information from a contour pattern of said binary-valued character image;

extracting feature quantities of said character from said feature information by using information on dividing lines for dividing said binary-valued character image into a plurality of portions, characterized by comprising:

tracing said contour portion of said binary-valued character image to thereby generate feature information on said contour portion;

setting a first region dividing line at a first position within the width of said contour portion viewed from an end of a circumscribed rectangular region to which said binary-valued character image is circumscribed;

setting a second region dividing line at a second position within the width of said contour portion viewed from an opposite end of said circumscribed rectangular region, said first and said second region dividing lines being used for extracting feature quantities of said character;

detecting intersection position where each of said first and second region dividing lines intersects said contour portion;

dividing said contour portion into a plurality of segments at said intersecting points so that said feature information on said contour portion is divided into partitioned feature information sequences relating to the corresponding segments; and extracting feature quantities of said character from said feature information on said contour portion by using information on said intersecting positions, from each of said partitioned feature information sequences whereby said feature quantities are used to recognize said character.

3. A method of extracting feature quantities of a character including the steps of:

optically scanning a character to be recognized to thereby generate a binary-valued character image;

extracting feature information from a contour pattern of said binary-valued character image;

extracting feature quantities of said character from said feature information by using information on dividing lines for dividing said binary-valued character image into a plurality of portions, characterized by comprising:

tracing said contour portion of said binary-valued character image to thereby generate feature information on said contour portion;

setting a first region dividing line at a first position within the width of said contour portion viewed from an end of a circumscribed rectangular region to which said binary-valued character image is circumscribed;

setting a second region dividing line at a second position within the width of said contour portion viewed from an opposite end of said circumscribed rectangular region, said first and said second region dividing lines being used for extracting feature quantities of said character;

detecting intersection position where each of said first and second region dividing lines intersects said contour portion;

equally dividing said feature information on said contour portion into a plurality of partitioned feature information sequences with respect to a reference position which is one of said intersecting positions; and extracting feature quantities of said character from said feature information on said contour portion by using information on said intersecting positions, from each of said partitioned feature information sequences whereby said feature quantities are used to recognize said character.

4. A method as claimed in claim 1, 2 or 3 characterized in that said feature information is represented by a sequence of direction codes of four different types of an up-direction code, a down-direction code, a right-direction code and a left-direction code, and in hat each of said direction codes indicates respective shift directions in which the tracing of said contour portion proceeds from a current tracing pixel of said contour portion to a next tracing pixel.

5. A method as claimed in claim 1, 2 or 3, characterized in that said end of the circumscribed rectangular region is a top end thereof, and said opposite end of the circumscribed rectangular region is a bottom end thereof.

6. A method as claimed in claim 1, 2 or 3, characterized in that said end of the circumscribed rectangular region is a left end thereof, and said opposite end of the circumscribed rectangular region is a right end.

7. A method as claimed in claim 4, characterized by further comprising a step of generating a projection of each of the different types of said direction codes by projecting said feature information on said contour portion in a predetermined projecting direction, said projection indicating the number of each of the different types of direction codes arranged in said predetermined projecting direction, wherein each of said positions within the width of said contour portion is obtained from said projection.

8. A method as claimed in claim 7, characterized in that said steps of setting said first and second region dividing lines include a step of detecting positions at which the number of the up-direction codes becomes identical to the number of the down-direction codes starting from the top and bottom ends of said circumscribed rectangular region, wherein said detected positions correspond to said first and second positions.

9. A method as claimed in claim 7, characterized in that said step of setting said first region dividing line includes a step of detecting a position a which the number of the left-direction codes becomes the smallest starting from the top and of the circumscribed rectangular region, said detected position corresponding to said first position, and in that the step of setting said second region dividing line includes a step of detecting a position at which the number of the right-direction codes becomes the smallest starting from the bottom end of said circumscribed rectangular region, said detected position corresponding to said second position.

10. A method as claimed in claim 7, characterized in that said steps of setting said first region and second region dividing lines include a step of detecting positions at which the number of the right-direction codes becomes identical to the number of the left-direction codes starting from right and left ends of said circumscribed rectangular region, wherein said detected positions correspond to said first and second positions.

11. A method as claimed in claim 7, characterized in that said steps of setting said first region dividing line includes a step of detecting a position at which the number of the down-direction codes becomes the smallest starting from the left end of the circumscribed rectangular region, said detected position corresponding to said first position, and in that the step of setting said second region dividing line includes a step of detecting a position at which the number of the up-direction codes becomes the smallest starting from the right end of said circumscribed rectangular region, said detected position corresponding to said region position.

12. A method as claimed in claim 2, characterized in that said feature quantities extracted for every partitioned feature information sequence are histograms of said direction codes which are said feature information on said contour portion.

13. A method as claimed in claim 2, characterized in that said feature quantities extracted for every partitioned feature information sequence comprises data which indicate the relationship in position between said region dividing lines and said partitioned feature information sequences.

14. A method as claimed in claim 13, characterized in that said relationship in position indicates whether ends of each of said partitioned feature information sequences are in contact with the inside or outside of said first region dividing line, and indicates whether ends of each of said partitioned feature information sequences are in contact with the inside or outside of said second region dividing line.

15. A method as claimed in claim 13, characterized by further comprising steps of counting the number of feature information contained in each of said partitioned feature information sequences, obtaining complexity of each of said partitioned feature information sequences from said counted number, and rearranging said data on the basis of said obtained complexity.

16. A method as claimed in claim 13, characterized by further comprising steps of counting the number of feature information contained in each of said partitioned feature information sequences, determining whether said number counted for every partitioned feature information sequence is equal to less than a predetermined value, and making a decision that said partitioned feature information sequences each having said counted number equal to or less than said predetermined value are noise.

17. A method as claimed in claim 12, characterized by further comprising a step of dividing each of said partitioned feature information sequences into n sub-sequences (n is an integer), wherein said step of extracting feature quantities includes a step of extracting feature quantities for every sub-sequence.

18. A method as claimed in claim 17, characterized in that said n is a number which is predetermined for each of said data.

19. A method as claimed in claim 17, characterized in that said n is a number which is predetermined on the basis of the number of said direction codes contained in said partitioned feature information sequences.

20. A method as claimed in claim 2, characterized in that said feature quantities extracted for each of said partitioned feature information sequences is represented by a histogram of said direction codes which are said feature information on said contour portion.

* * * * *